United States Patent
Paduvalli

(10) Patent No.: US 12,225,014 B2
(45) Date of Patent: Feb. 11, 2025

(54) EFFICIENT HITLESS UPGRADE OF PACKET PROCESSING FILTERS

(71) Applicant: Arista Networks, Inc., Santa Clara, CA (US)

(72) Inventor: Ramakrishna Paduvalli, Saratoga, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 367 days.

(21) Appl. No.: 17/861,685

(22) Filed: Jul. 11, 2022

(65) Prior Publication Data

US 2023/0308447 A1     Sep. 28, 2023

Related U.S. Application Data

(60) Provisional application No. 63/306,631, filed on Feb. 4, 2022.

(51) Int. Cl.
*H04L 9/40* (2022.01)

(52) U.S. Cl.
CPC ........ *H04L 63/101* (2013.01); *H04L 63/0254* (2013.01); *H04L 63/0263* (2013.01)

(58) Field of Classification Search
CPC .............. H04L 63/101; H04L 63/0254; H04L 63/0263; H04L 47/2441; H04L 63/0227; H04L 69/22; H04L 45/74591; H04L 41/0894; G06F 2221/2141
See application file for complete search history.

(56) References Cited

U.S. PATENT DOCUMENTS

| | | | |
|---|---|---|---|
| 6,651,096 B1 * | 11/2003 | Gai | H04L 63/101 709/225 |
| 6,970,462 B1 | 11/2005 | McRae | |
| 7,181,567 B2 | 2/2007 | Krishnan | |
| 7,720,948 B2 | 5/2010 | Hariharan et al. | |
| 8,090,901 B2 | 1/2012 | Lin et al. | |
| 8,448,162 B2 | 5/2013 | Ramanathan et al. | |
| 8,750,144 B1 | 6/2014 | Zhou et al. | |

(Continued)

FOREIGN PATENT DOCUMENTS

WO    WO2017219842 A1    12/2017

OTHER PUBLICATIONS

Eugene W. Myers, "An O(ND) Difference Algortihm and Its Variations", Department of Computer Science, University of Arizona, vol. 1, Issue 1-4, Tucson, AZ, Nov. 1986, 15 pages.

(Continued)

*Primary Examiner* — Techane Gergiso
(74) *Attorney, Agent, or Firm* — Fountainhead Law Group, PC

(57) ABSTRACT

Upgrading packet processing rules in a network device with a replacement set of rules includes generating an edit sequence that represents edit operations to transform an already-installed old set of rules into the replacement rules. The edit sequence is used to identify a subsequence of rules that is common to both the old rules and the replacement rules. A merged list is generated by a combination of the old rules, the replacement rules, and the common subsequence of rules. The merged list is downloaded to the network device, overwriting the old rules in bottom-up fashion to allow packet processing to continue concurrently using the old rules.

20 Claims, 23 Drawing Sheets

(56) References Cited

U.S. PATENT DOCUMENTS

| | | | |
|---|---|---|---|
| 10,129,088 B2 | 11/2018 | Sharma et al. | |
| 2004/0170171 A1* | 9/2004 | Kanekar | H04L 45/54 |
| | | | 707/E17.035 |
| 2006/0294297 A1* | 12/2006 | Gupta | G11C 15/00 |
| | | | 711/108 |
| 2010/0080223 A1* | 4/2010 | Wong | H04L 45/00 |
| | | | 370/392 |
| 2013/0218853 A1* | 8/2013 | Bullis | H04L 47/39 |
| | | | 707/694 |
| 2013/0232104 A1* | 9/2013 | Goyal | G06N 5/02 |
| | | | 706/59 |
| 2013/0304917 A1* | 11/2013 | Mittal | H04L 63/101 |
| | | | 709/225 |
| 2020/0412615 A1 | 12/2020 | Baskaran et al. | |

OTHER PUBLICATIONS

Chang et al., TCAM-Based Multi-Match Packet Classification Using Multidimensional Rule Layering, IEEE Apr. 1, 2016, All pages.

Norige et al., A Ternary Unification Framework for Optimizing TCAM-Based Packet Classification Systems, Apr. 2018, IEEE, All Pages.

Shah et al., Fast updating algorithms for TCM, IEEE Micro (vol. 21, Issue 1, pp. 36-47, 2001.

* cited by examiner

FIG. 14

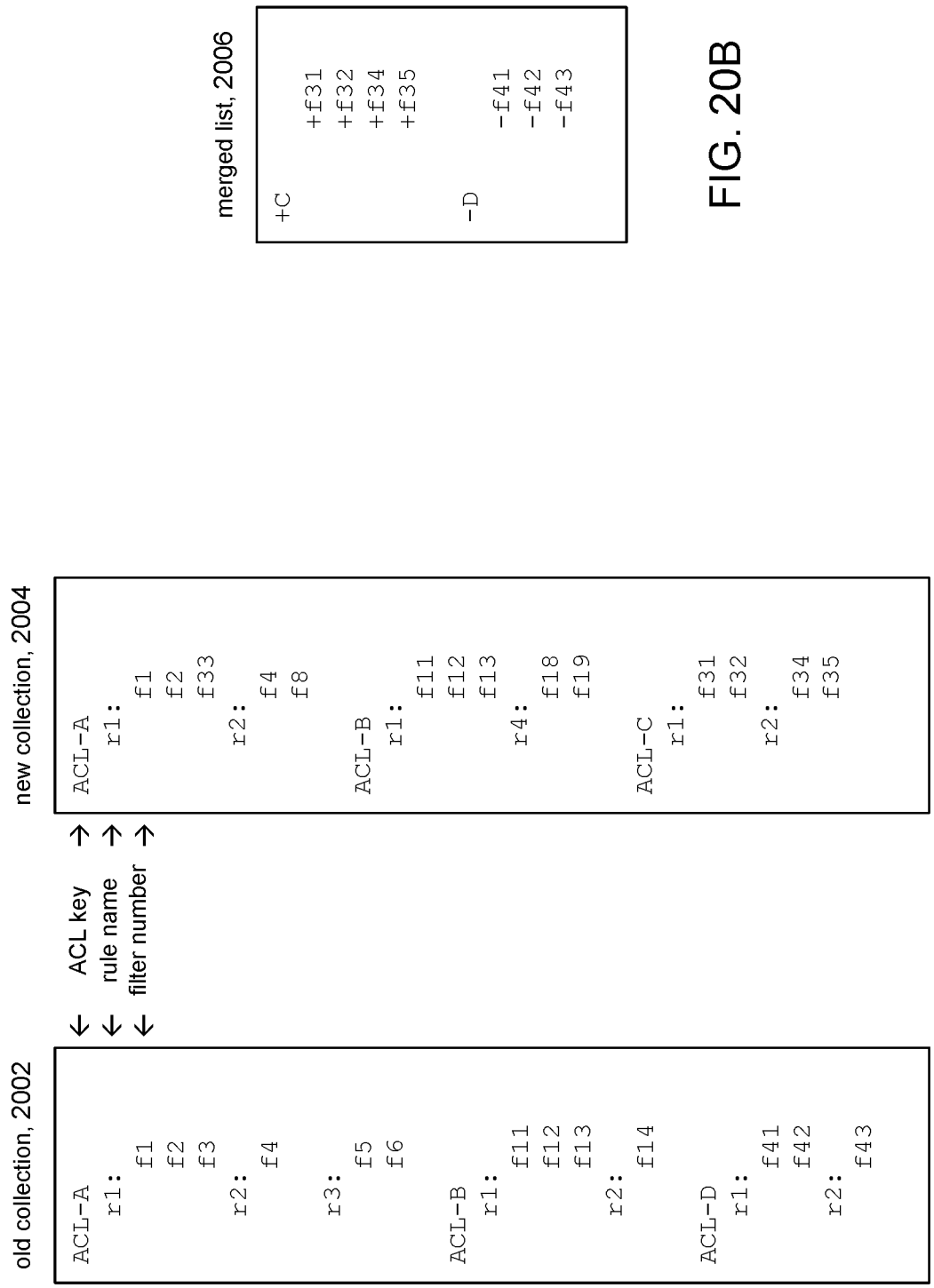

merged list, 2006

ACL-A:
f1
f2
-f3
+f33
f4
+f8
-f5
-f6

ACL-B:
f11
f12
f13
-f14
+f18
+f19

ACL-C:
+f31
+f32
+f34
+f35

ACL-D:
-f41
-f42
-f43

FIG. 20D

```
ACL LCS
ACL-A # present in both old and new
    Rules LCS:
        r1: # present in both old and new → do filter LCS
            Filter LCS:
                f1
                f2
                -f3
                +f33
        r2: # present in both old and new
            Filter LCS:
                f4
                +f8
        -r3: # missing in new
            -f5
            -f6
ACL-B # present in both old and new
    Rules LCS:
        r1: # present in both old and new
            Filter LCS:
                f11
                f12
                f13
        -r2:
            -f14
        +r4:
            +f18
            +f19
```

FIG 20C

EFFICIENT HITLESS UPGRADE OF PACKET PROCESSING FILTERS

CROSS REFERENCE TO RELATED APPLICATIONS

Pursuant to 35 U.S.C. § 119 (e), this application is entitled to and claims the benefit of the filing date of U.S. Provisional App. No. 63/306,631 filed Feb. 4, 2022, the content of which is incorporated herein by reference in its entirety for all purposes.

This application is related to commonly owned U.S. Pat. No. 11,063,830, the content of which is incorporated herein by reference in its entirety for all purposes.

BACKGROUND

Network devices typically use some type of content-addressable memory (CAM) to express packet classifiers (packet processing rules) and associated actions to process packets. The use of CAM technology allows for high throughput processing of packets. A commonly used type of CAM is a ternary CAM (TCAM) because its three data state memory can provide wildcard capability for matching packets.

When edits have to be made to the rules, users want to be able to install the updates to the network device "hitlessly"; in other words, without impacting ongoing processing of packets in the network device.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 14 shows an example of finalizing a downloaded merged list into a TCAM in accordance with the processing described in FIG. 11.

FIGS. 20A, 20B, 20C, 20D show an example for processing ACLs in accordance with the present disclosure.

DETAILED DESCRIPTION

Figure 1:
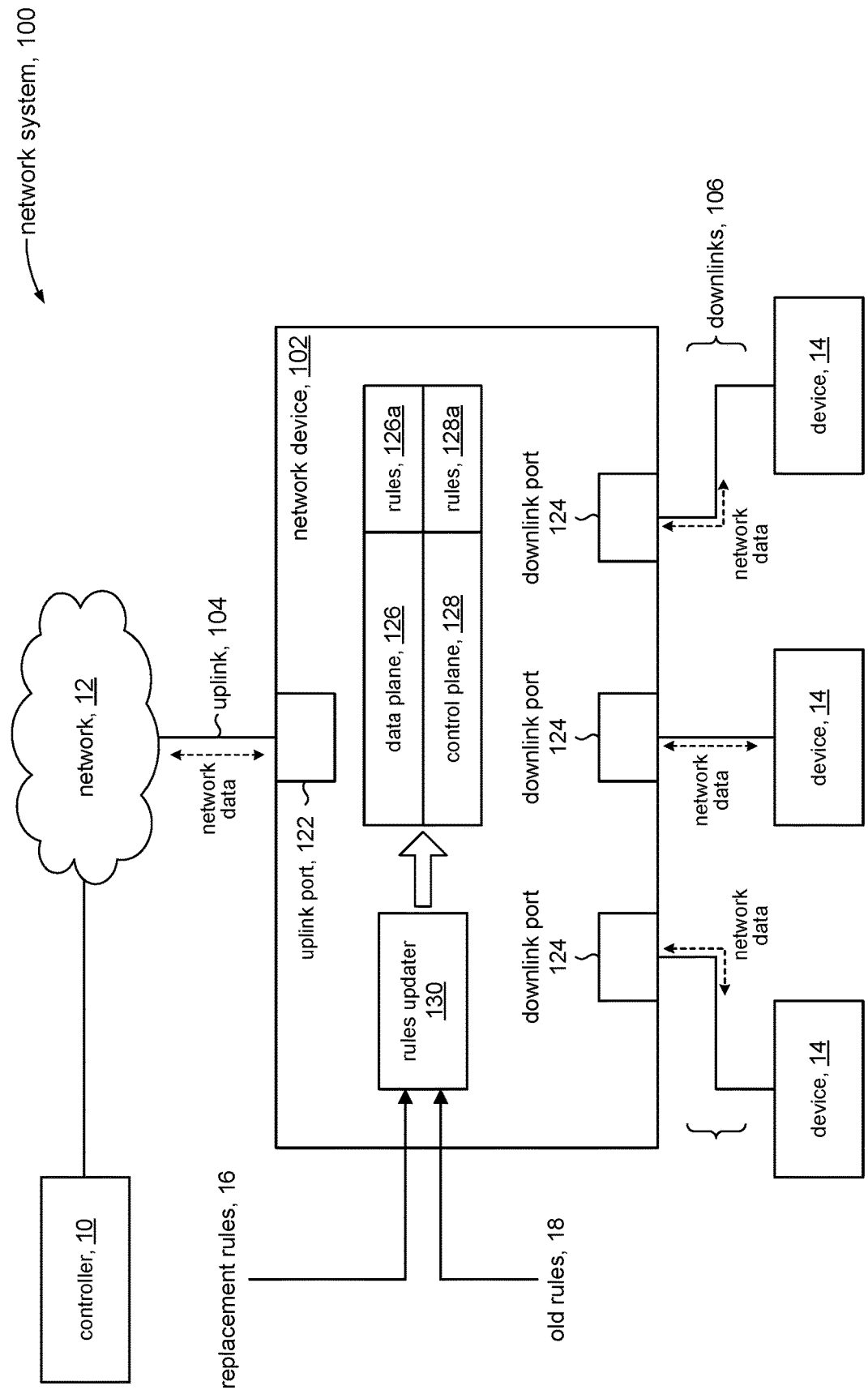
FIG. 1 illustrates a system block diagram of a network device in accordance with some embodiments.

An approach for hitlessly updating packet processing rules is sometimes referred to as make-before-break. This approach takes advantage of the availability of an atomically updatable data bit that can be included in the underlying TCAM hardware. Version bits can be incorporated in the rules, and the atomically updatable data bit can be used to provide a corresponding system-level version bit for selecting rules based on their corresponding version bits. The make-before-break processing goes essentially as follows:

1. Suppose the current version of the rules (say, v0) currently being used in the TCAM have their version bits set to binary 0, and that the next version of rules (say, v1) have their version bits set to binary 1.
2. The v0 rules remain untouched in the TCAM, while the v1 rules are computed and downloaded to the TCAM. The system-level version bit can be set to binary 0 so that packets match the v0 rules while this is happening.
3. The system-level version bit is then atomically updated to v1. Packets then start matching the v1 rules at this stage.
4. The older version (v0 rules) are then deleted from the classifier stages. Packets continue to match the v1 rules during this update and going forward afterwards.

In other architectures, the system-level version bit can be atomically set via supporting hardware (e.g., a network processor), rather than being a property of the TCAM hardware itself. The system-level version bit is essentially an atomically updatable state (e.g., whether via a register in TCAM or in a supporting hardware component like a network processor using the TCAM) and thus can be carried along with the packet fields as 'metadata.'

This approach assumes the availability of resources to store both v0 and v1 rules in the TCAM simultaneously. A straightforward approach is to sum up the resources needed for the v0 and v1 rules and ensure that there is room in the TCAM before indicating to the user that the update can be done hitlessly. TCAM resources are often highly utilized and the make-before-break approach can become an impediment to hitless upgrades when utilization in the TCAM becomes greater than 50%.

The present disclosure describes a process for hitless upgrade of TCAM rules (and more generally rules represented using ternary expressions) in a packet classifier to replace the old list of rules in the TCAM with a new list of rules in a way that reduces the storage requirements in the TCAM. In accordance with a specific illustrative embodiment, for example, the process can include creating a merged list of rules that contains rules unique to the old list, rules that constitute a "longest mergeable subsequence" (LMS) of rules, and rules that are unique to the new list. The LMS can refer to the longest subsequence of rules in the old list, where the rules in the LMS occur in the new list in the same order but not necessarily contiguously. The LMS represents a maximum overlap of rules between the old list and the new list.

The LMS can reduce the storage requirements for a hitless upgrade by the number of rules in the LMS. Conventional hitless upgrades require storage for $N_{old}+N_{new}$ rules; the TCAM must be able to store the entirety of both lists. By comparison, hitless upgrade in accordance with the present disclosure can reduce that amount by $N_{LMS}$ rules, namely the storage requirement is for $(N_{old}+N_{new}-N_{LMS})$ rules, because the LMS contains both old and new rules; this overlap reduces the total number of rules that need to be stored in the TCAM.

In many scenarios it is likely that the old list and new list are very similar and thus would have many entries in common. Processing in accordance with embodiments of the present disclosure can advantageously reduce the storage requirements in order to provide hitless upgrades of rules in a packet classifier while at the same time reducing storage requirements in the TCAM.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 is a high level block diagram of network device 102 in network system 100 to communicate data between network 12 (e.g., physical network, virtualized network, etc.) and a number of devices 14. In some embodiments, network device 102 can be a switch, router, hub, bridge, gateway, and the like. More generally, network device 102 can be any kind of device that can provide access to network 12 to provide network connectivity to devices 14. In some embodiments, for example, network device 102 can communicate with network 12 via uplink 104 coupled between the network and uplink port 122 of the network device. Similarly, network device 102 can communicate with each device 14 via a respective downlink 106 coupled between the device and a respective downlink port 124 of the network device.

Generally, uplink port 122 and uplink 104 can be configured for a high-speed wired connection (e.g., copper, fiber, etc.) to provide increased throughput capability relative to downlink ports 124 and downlinks 106. The respective downlinks 106 between network device 102 and devices 14 can be any suitable connection, including wired connections and wireless connections.

In some embodiments, device 14 can be any type of device that can communicate network data with another device, such as a personal computer, laptop, or server. Device 14 can also be a mobile device (e.g., phone, smartphone, personal gaming device, etc.), or another network device. In some embodiments, devices 14 can be virtual machines or can be a host machine that hosts one or more virtual machines, and so on.

Network data can be communicated by network device 102 over uplink 104 and downlinks 106 using any suitable communication protocol; e.g., transmission control protocol (TCP), file transfer protocol (FTP), simple mail transfer protocol (SMTP), Ethernet, Telnet, etc., The network data being communicated by network device 102 can be a stream of network frames, datagrams or data packets, or other types of discretely switched network data. In some embodiments, for example, network device 102 can communicate network data between devices 14 and network 12 or between devices 14 using a variety of communicating techniques (e.g., layer 2 switching, layer 3 routing, etc.).

Network device 102 can include data plane 126 (also referred to as a forwarding plane) to receive, process, and forward network data to the next hop according to various configuration data such as forwarding information, security data, quality of service (QOS) levels, and the like. Network device 102 can include control plane 128 to make decisions about where network traffic (i.e., network data) is sent.

Data plane 126 and control plane 128 can include respective packet processing rules 126a, 128a comprised of classifiers and corresponding actions (not shown). Packet processing rules may be referred to herein as "packet routing rules," "rules," and the like. Changes in network topology, network policy, and the like typically require corresponding changes in packet processing rules 126a and/or 128a. In accordance with some embodiments of the present disclosure, replacement rules 16 can be processed by rules updater 130 to replace an older version (set) of rules 18 that are currently installed in network device 102 (e.g., in data plane 126 and/or control plane 128). This aspect of the present disclosure is discussed in more detail below. Rules 16, 18 can be generated from access control list (ACL) rules provided, for example, from network controller 10.

Figure 2:
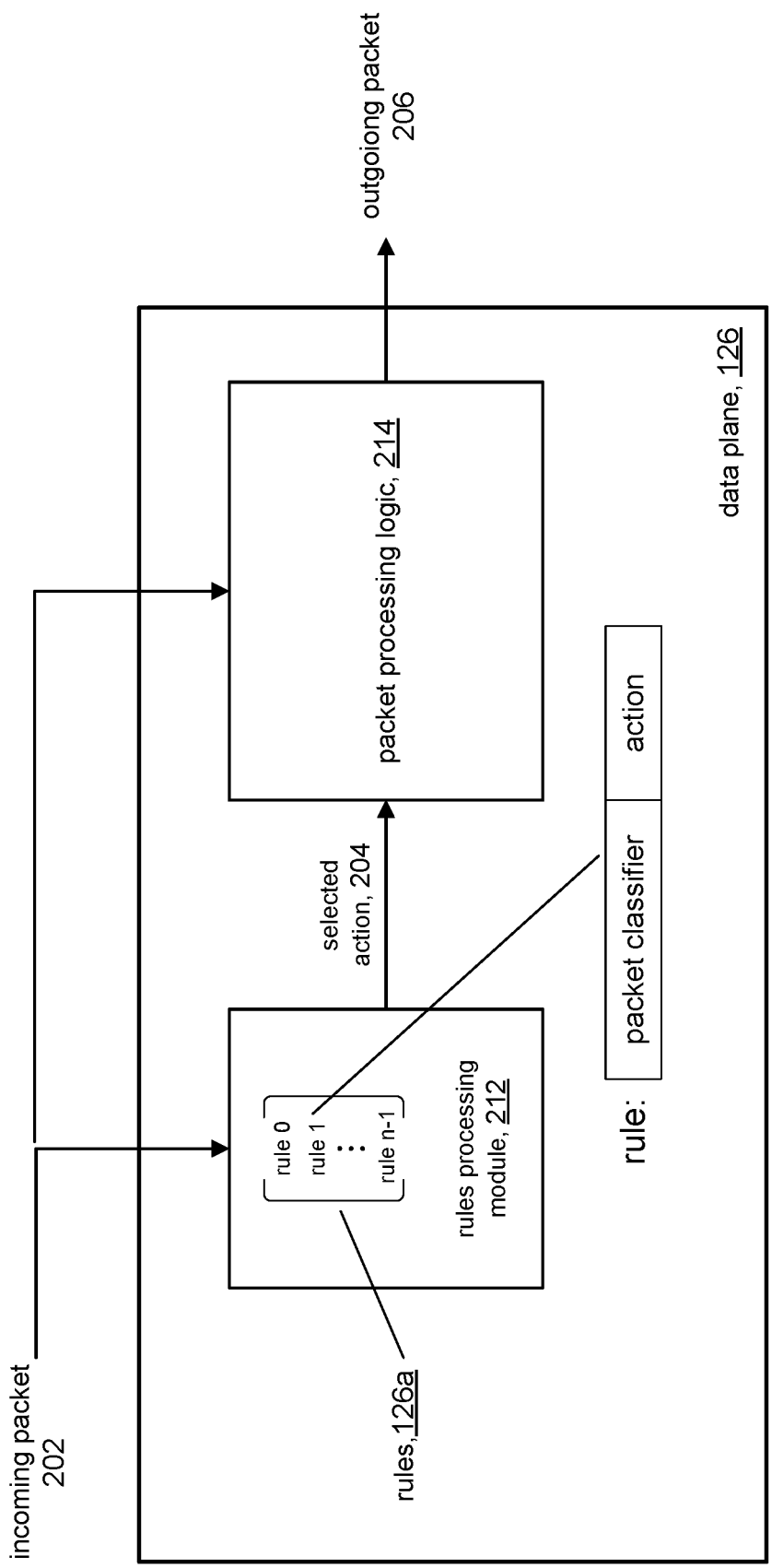
FIG. 2 illustrates details of a data plane in accordance with some embodiments.

Turning to FIG. 2, a brief overview of the flow of network data in network device 102 will be described. Merely to illustrate the description, the flow of network data in data plane 126 shown in FIG. 1 will serve as an example. Data plane 126 can include rules processing module 212 and packet processing logic 214. An incoming packet 202 can be initially processed by rules processing module 212 to determine a suitable action to be performed on the incoming packet. Rules processing module 212 can include a list of packet processing rules 126a (hereinafter, "rules") to facilitate identifying a suitable action. Rules processing module 212 can produce selected action 204, which can then be provided to packet processing logic 214. Selected action 204 can direct or otherwise influence the processing of incoming packet 202 by packet processing logic 214 to produce outgoing packet 206.

Figure 3:
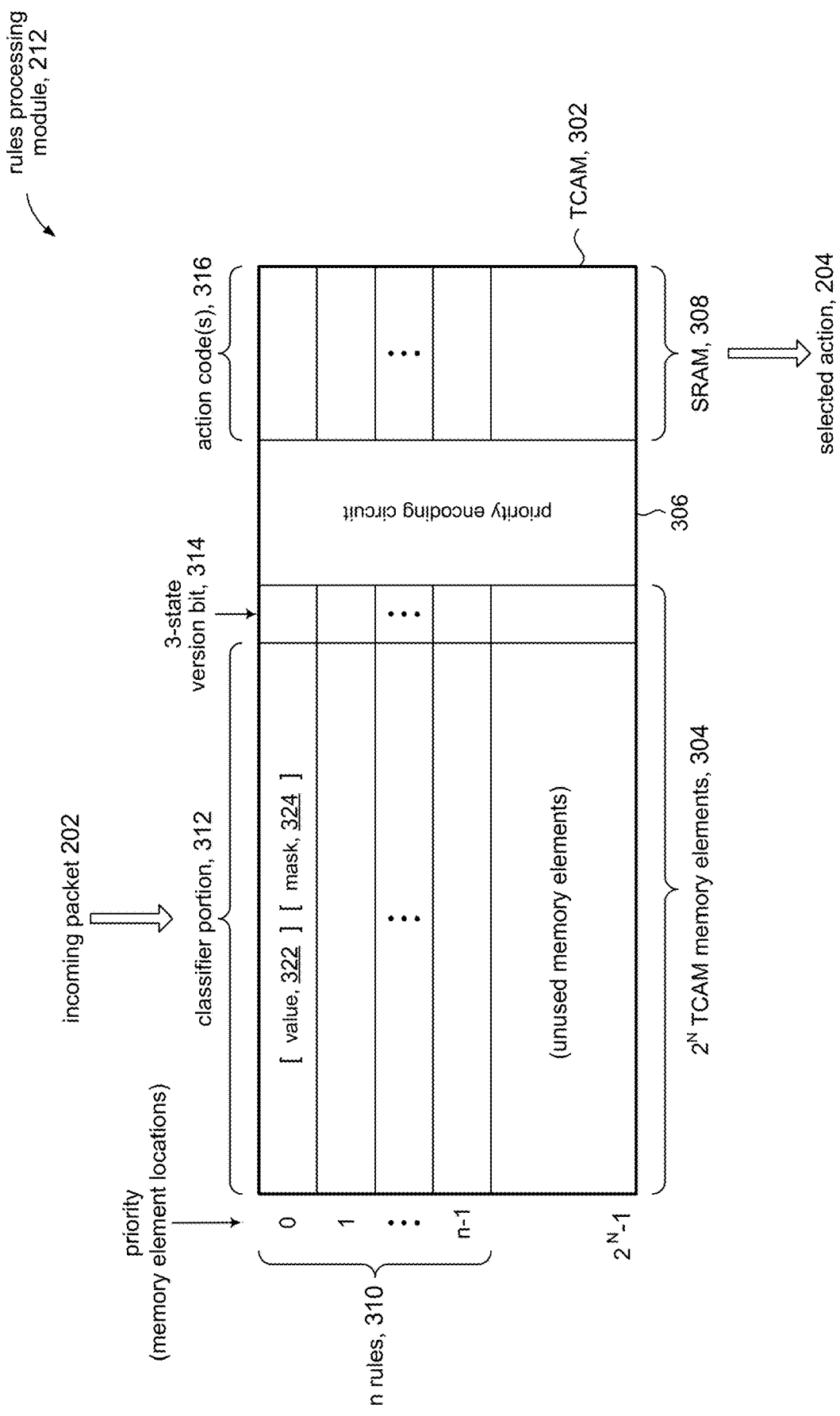
FIG. 3 illustrates details for a rules processing module, such as shown in FIG. 2, in accordance with some embodiments.

Rules 126a stored in rules processing module 212 can be prioritized. As depicted in FIG. 2, for example, rule 0 can be deemed to be higher in priority than rule 1, rule 1 can be deemed to be higher in priority than rule 2, and so on. Each rule (e.g., rule 1) comprises a packet classifier portion and an action portion (FIG. 3). When rules processing module 212 receives incoming packet 202, the incoming packet can be matched against the packet classifier portions of each rule. In the case that incoming packet 202 matches multiple rules, the highest priority of the matched rules is selected. Rule processing module 212 will process incoming packet 202 against the matched rule, and output its associated action portion, as selected action 204.

In some embodiments, rules 126a can be stored in a ternary content-addressable memory (TCAM). A TCAM is a type of content-addressable memory (CAM), also known as "associative storage." CAMs compare the desired information against all prestored entries simultaneously. CAMs can employ non-volatile memory (e.g., static RAM (SRAM)) with additional circuitry that enables search operations to complete in a single cycle. CAMs provide fast table lookups, and are often found in network routers and switches. While a CAM stores bits in one of two data states (binary 0 and binary 1), a TCAM can store a data bit in a third data state referred to as the "don't care" ('X') state, where the data bit acts as a wildcard and will match either a binary 0 or a binary 1. In accordance with some embodiments of the present disclosure, the rules can use this wildcard data state for their version bits.

It is noted that the rules need not be stored in a TCAM, which is generally more costly, consumes board space, and consumes more power. In some embodiments, for example, rules 126a can be stored in memory that is less costly than TCAMs such as, for instance, SRAMs. In some use cases, for example, speed of operation may not be so important as to merit the cost of a TCAM, and instead SRAMs can be employed along with a suitable search algorithm to provide the same rule searching functionality. The remaining disclosure will use TCAMs as examples for discussion purposes, without loss of generality and with the understanding that the present disclosure can be practiced in embodiments that do not use TCAMs.

FIG. 3 is a schematic representation of an embodiment of rules processing module 212 that is based on a TCAM 302. In some embodiments, for example, TCAM 302 can include a memory component comprising $2^N$ TCAM memory elements 304 that comprise 3-state memory cells and support circuitry (not shown) to enable simultaneous comparison of incoming packet 202 against every memory element 304 in the TCAM. Rule priority can be based on where in the rule is stored; e.g., the location of each memory element (0 . . . $2^N-1$) can correspond to the priority of a rule. In some embodiments, for example, the convention can be to store the highest priority rule in location 0, the next highest priority rule in location 1, and so on. It will be appreciated, however, that rule priority can be established in other ways.

TCAM 302 can include priority encoder circuit 306. When incoming packet 202 matches a rule in a memory element, that element can become "active." In the case of multiple matches, multiple memory elements can become active. Priority encoder circuit 306 can provide an N-bit output that represents the position of the highest priority active TCAM memory element to ensure that only one active memory element is identified. In some embodiments, each of the $2^N$ TCAM memory elements 304 can output a binary '0' signal or binary '1' signal to priority encoder circuit 306 depending on whether or not the memory element is active (e.g., matches incoming packet 202). Priority encoder circuit 306 can output an N-bit value that represents the highest priority memory element among the active memory elements.

TCAM 302 can include SRAM 308. Each TCAM memory element 304 has a corresponding memory location in SRAM 308. The N-bit output of priority encoder circuit 306 can be used to access the memory location in SRAM 308 that corresponds to the highest priority active TCAM memory element identified by the priority encoder circuit.

As shown in FIG. 3, in some embodiments, each packet processing rule 310 can comprise packet classifier portion 312 and action code(s) 316. Classifier portion 312 can comprise one or more value/mask fields, with each field comprising value component 322 and mask component 324. Incoming packet 202 is "classified" by matching the value/mask field(s) in each rule 310 against corresponding fields in the incoming packet. Action code(s) 316 represents one or more actions to be taken when incoming packet 202 matches the corresponding rule. In some embodiments, the classifier portion of each rule 310 can be stored in the TCAM memory elements of TCAM 302 and the associated action code component can be stored in a memory location in SRAM 308 that corresponds to the rule's location in the TCAM.

In some embodiments, each rule 310 can include 3-state version bit 314. The version bits can be used to identify whether the rule is an old rule or a replacement rule. For example, rules 310 already installed in TCAM 302 ("old rules") have their version bits 314 set to a first data state (e.g., data state '0'). Logic (not shown) in rules processing module 212 can then be controlled or signaled to process incoming packets with rules whose version bits are set to the first data state.

The use of version bits allows for replacement rules to be downloaded and stored in the TCAM without interfering with the old rules. Rules in a replacement list ("replacement rules"), for example, would have their version bits set to a second data state different from the first data state (e.g., data state '1') so that the logic in rules processing module 212 can distinguish between the already installed old rules and the replacement rules. When the replacement rules are ready to be activated to do packet matching, the logic in the rules processing module 212 can be controlled to use rules with version bits set to the second data state to process incoming packets with. When another set of replacement rules needs to be downloaded, the version bits in those rules can be set to the first data state to distinguish from the newly activated rules that have their version bits set to the second data state. In this way, the version bits can toggle between the first and second data states with each successive set of replacement rules. In accordance with the present disclosure, the version bits can be set to the "don't care" (wildcard) data state 'X' during the update process when a set of replacement rules is downloaded to the TCAM 302. This aspect of the present disclosure is discussed in more detail below.

Figure 4:
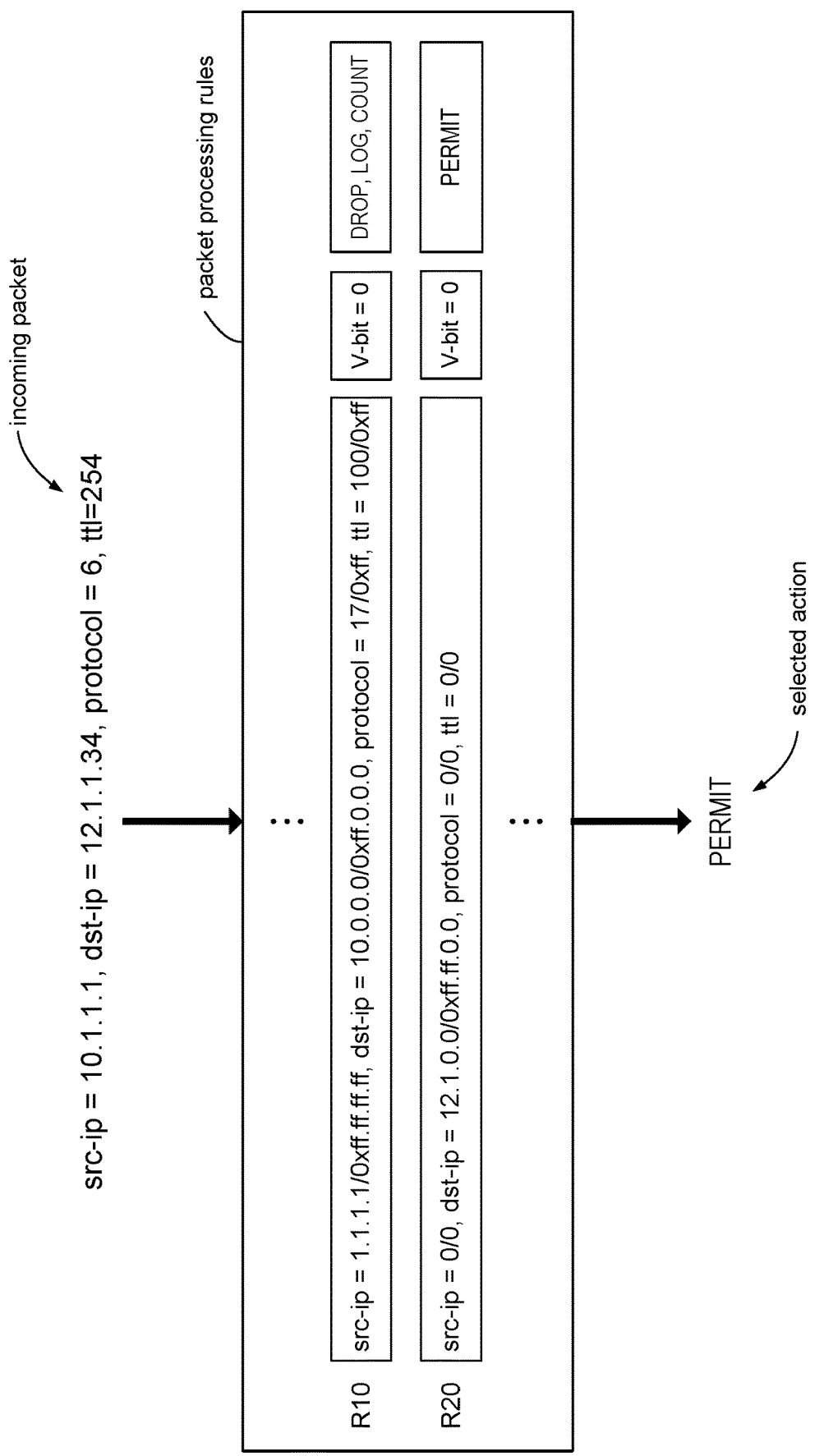
FIG. 4 illustrates examples of packet processing rules.

FIG. 4 provides some specific examples of rules. FIG. 4 shows a set of packet processing rules (e.g., stored in a TCAM) that includes rules R10 and R20. The classifier portion of rule R10 comprises four fields which are expressed as value/mask pairs: a first field (src-ip=1.1.1.1/ 0xff.ff.ff.ff) specifies a value component 1.1.1.1 and a mask component 0xff.ff.ff.ff to match against the source IP portion in an incoming packet; a second field (dst-ip=10.0.0.0/ 0xff.0.0.0) specifies a value of 10.0.0.0 and a mask 0xff.0.0.0 to match against the destination IP portion in the incoming packet; a third field (protocol=17/0xff) is used to match against the protocol specified in the incoming packet; and a fourth field (ttl=100/0xff) is used to match against the incoming packet's time-to-live value. In addition, rule R10 is associated with three actions: DROP, LOG, and COUNT so that an incoming packet that matches the classifier portion of rule R10 will be processed according to the three actions. Likewise, the classifier portion of rule R20 comprises four value/mask fields: src-ip=0/0, dst-ip=12.1.0.0/0xff.ff.0.0, protocol=0/0, and ttl=0/0, and is associated with one action, namely PERMIT. The examples depicted in FIG. 4 show that the number of value/mask fields in a rule can vary from one rule to another, as well the kind of data (IP, ttl, etc.) that is matched. The number of actions can vary from one rule to another.

To complete the discussion, the incoming packet shown in FIG. 4 will match rule R20, and so the selected action that would be produced by a rules processing module (e.g., 212) will be the PERMIT action associated with rule R20.

Figure 5A:
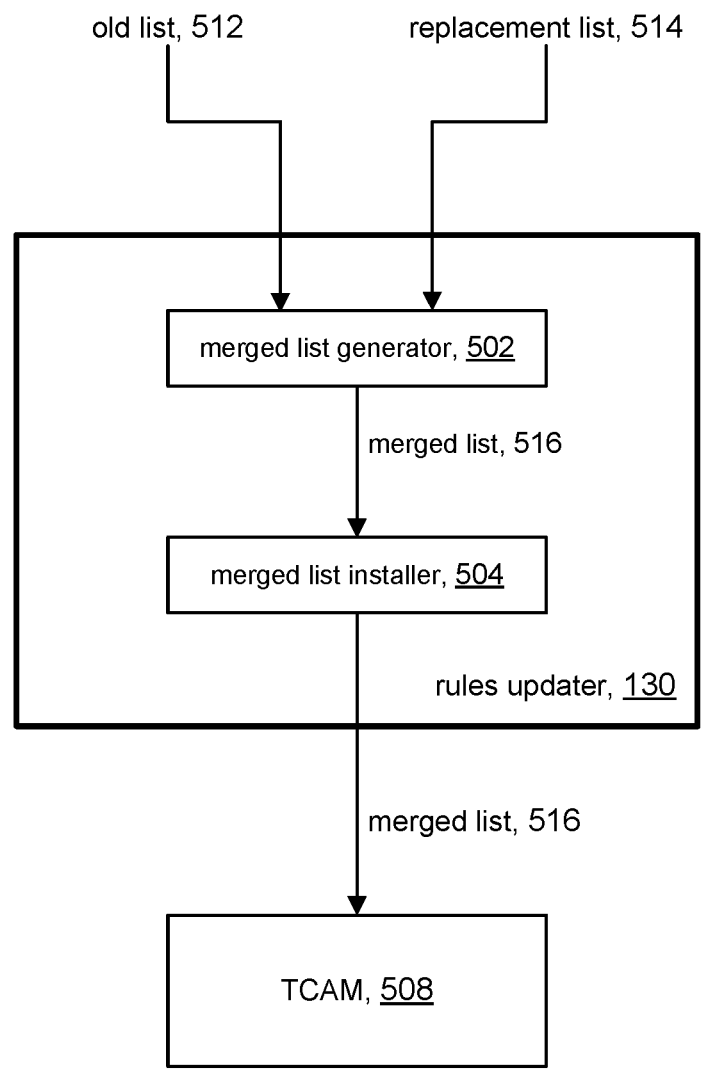
FIG. 5A illustrates details for a rules updater, such as shown in FIG. 1, in accordance with some embodiments.

FIG. 5A illustrates details of rules updater 130 shown in FIG. 1 in accordance with the present disclosure. The function of rules updater 130 is to update or otherwise upgrade packet processing rules in network device 102 by replacing a set of rules already installed or otherwise downloaded to the network device (old rules 512) with a set of replacement rules 514. In some embodiments of the present disclosure, rules updater 130 can include merged list generator 502 to generate merged list 516 from old rules 512 and replacement rules 514. Merged list installer 504 can install or otherwise download merged list 516 into a TCAM 508 in accordance with the present disclosure to effect replacement of the old list of rules with the replacement list of rules.

Figure 5B:
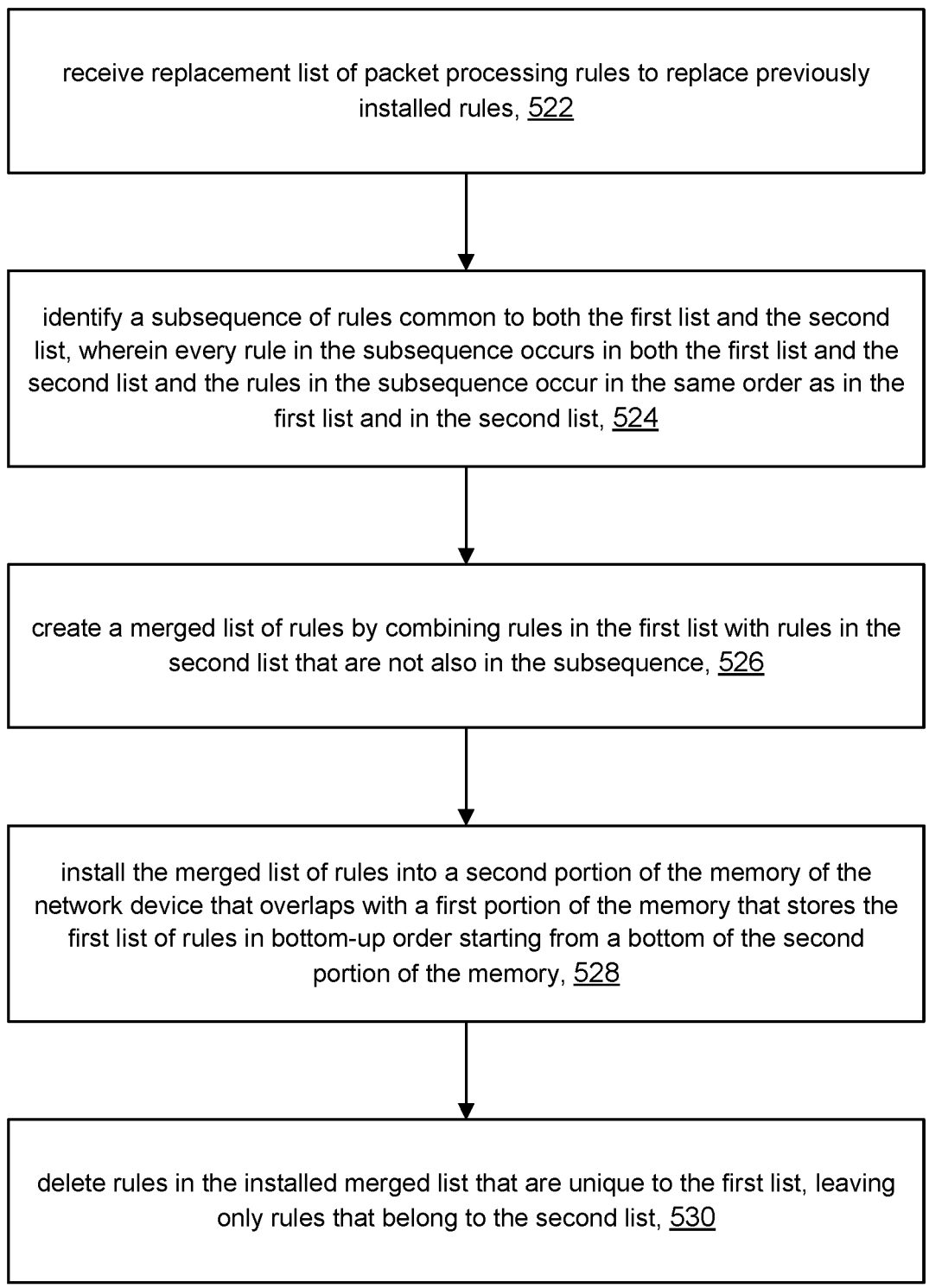
FIG. 5B illustrates an example of the flow of operations of the rules updater in accordance with some embodiments.

Referring to FIG. 5B, the discussion will now turn to a high level description of processing in network device 102 (e.g., by rules updater 130 in accordance with the present disclosure. In some embodiments, for example, network device 102 can include computer executable program code, which when executed by a processor (e.g., 1502, FIG. 15), can cause the network device to perform processing in accordance with FIG. 5B. The flow of operations performed by the network device is not necessarily limited to the order of operations shown. These operations are discussed in more detail below.

At operation 522, network device 102 can receive as inputs a first list of packet processing rules (e.g., old rules list 512) and a second list of packet processing rules (e.g., replacement rules list 514). For example, old list 512 can be the set of rules that have been previously installed in or otherwise downloaded to network device 102. In some embodiments, for example, old list 512 can be provided to merged list generator 502 directly from within network device 102. In other embodiments, old list 512 can be provided to rules updater 130 from a source external to network device 102; e.g., by a system administrator. Replacement list 514 can refer to a new set of rules to replace the old set of rules. Replacement list 514 can include one or more rules from the old list and one or more new rules. For instance, a system administrator may make several modifications to the old rules which can be then downloaded to TCAM 508 as replacement rules. In other instances, modification of the old rules may be internally triggered by a network event and the like.

At operation 524, network device 102 can identify a subsequence of rules common to both the first list and the second list (e.g., FIG. 8A), wherein every rule in the subsequence occurs in both the first list and the second list and the rules in the subsequence occur in the same order as in the first list and in the second list.

At operation 526, network device 102 can create a merged list of rules (e.g., FIG. 10) by combining rules in the first list with rules in the second list that are not also in the subsequence.

At operation 528, network device 102 can install or otherwise download the merged list of rules into a second portion of the memory (e.g., TCAM) of the network device to effect replacement of the old list of rules with the replacement list of rules. In some embodiments, the second portion of memory can overlap with a first portion of the memory that stores the first list of rules in bottom-up order starting from a bottom of the second portion of the memory. See, for example, times T4, T5, T6 in FIG. 13.

At operation 530, network device 102 can delete rules in the installed merged list that are unique to the first list, leaving only rules that belong to the second list. See, for example, times T2, T3 in FIG. 14.

Figure 6:
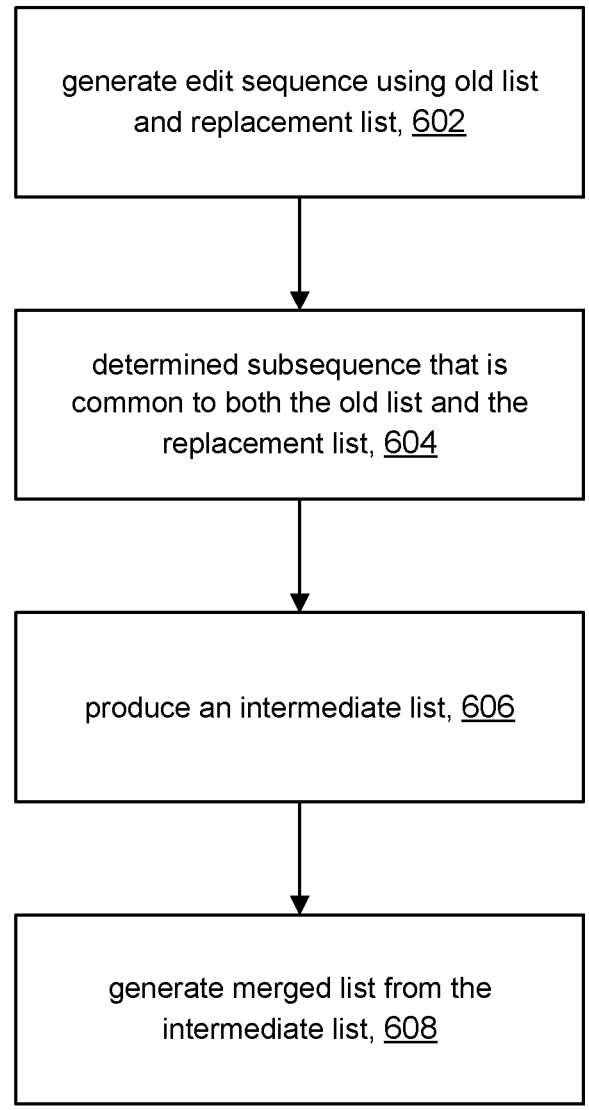
FIG. 6 illustrates an example of processing to generate a merged list in accordance with the present disclosure.

Referring to FIG. 6, the discussion will now turn to a high level description of processing in network device 102 (e.g., by merged list generator 502 in rules updater 130, FIG. 5A) to produce a merged list in accordance with the present disclosure. In some embodiments, for example, network device 102 can include computer executable program code, which when executed by a processor (e.g., 1502, FIG. 15), can cause the network device to perform processing in accordance with FIG. 6. The flow of operations performed by the network device is not necessarily limited to the order of operations shown. Illustrative details for the operations shown in FIG. 6 are provided with examples in FIGS. 7A, 7B, 7C, 8A, 8B, 9A, 9B, 9C, and 10.

Operation 602 (FIG. 6)

Figure 7A:
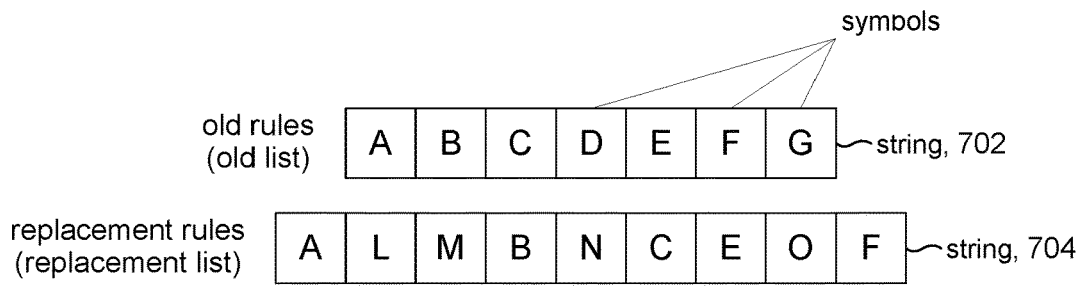
FIGS. 7A 7B, 7C show examples of rules and an edit sequence in connection with the processing described in FIG. 6.

At operation 602, network device 102 can generate an edit sequence from an old (first) list of rules and a replacement (second) list of rules. In accordance with the present disclosure and for reasons that will be explained below, each rule can be viewed or represented by a symbol, and the set of rules in a list can be represented as a string of symbols. Referring to FIG. 7A for example, let string 702 represent an old list of rules that is already installed in network device 102. The order of symbols in string 702 can indicate the order of priority of the rules, and a convention can be adopted whereby the symbol at the beginning of the string represents the highest priority rule with subsequent symbols in the string representing successively lower priority rules. For example, the rule represented by symbol 'A' in string 702 represents the highest priority rule in the old list, whereas the lowest priority rule is represented by symbol 'G'.

Let string 704 represent a replacement list of rules that are to be installed in network device 102, in place of the old list. The replacement rules may include rules from the old list, rules from the old list appearing in different order, new rules not found in the old list, and so on. The example shown in FIG. 7A, for instance, shows that the replacement rules include rules that are the same as in the old list, namely rules A, B, C, E, F and rules that are different (new) from the old list, namely L, M, N, O.

Figure 7B:
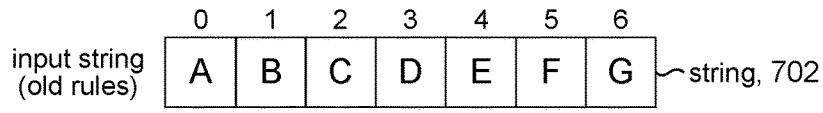

Two rules can be deemed "different" if they match different packets. Moreover, even if two rules match the same packet, they can be deemed different if they perform different actions (operations). An example is shown in FIG. 7B with rules X and Y. The two rules are identical except for the action portion-rule X is associated with action PERMIT and rule Y is associated with action DROP; rules X and Y can be deemed to be different from each other.

Recall from the discussion of version bits in FIG. 3 that in some embodiments a rule can include a version bit that is set to one data state (e.g., data state '0') to indicate that it is an old rule and the version bit that can be set to another data state (e.g., data state '1') to indicate it is a replacement rule. The version bit, therefore, does not affect which packets are matched or the action performed when the same packet is matched, just whether the rule participates in the packet matching process. Thus, although the rules A, B, C, E, F that appear in string 704 (replacement list) are intended to be the same rules in string 702 (old list), they will differ in the data states of their version bits; e.g., rule A in string 704 will have a different version bit setting than rule A in string 702. This is more clearly illustrated, for example, in FIG. 7B with rules X and Z. The two rules are identical except for the version bit (V-bit); rule X has its version bit set to '0' and rule Z has its version bit set to '1'. In accordance with the present disclosure, the version bits can be ignored when making a determination whether two rules are identical. Rules X and Z in FIG. 7B, for example, can therefore be deemed to be identical.

In accordance with the present disclosure, by treating the old rules and replacement rules as strings of symbols, it can be appreciated that an edit sequence can be generated that lists a set of changes (edits) to the old list of rules (represented by string 702) to transform the old list into the replacement list (represented by string 704). In some embodiments in accordance with the present disclosure, for example, a difference algorithm that generates an edit sequence can be based on conventional text comparison algorithms to compare the old and replacement rules by treating them as strings 702, 704. Text comparison algorithms are known, and a commonly known algorithm is disclosed in the publication entitled "An O(ND) Difference Algorithm and Its Variations," by Eugene W. Meyers in *Algorithmica*, November 1986, Volume 1, Issue 1-4, pp 251-266, which is incorporated herein by reference in its entirety for all purposes. This algorithm is used in the Linux™ operating system (OS) and other UNIX™ based OS's. It will be understood, however, that any suitable text comparison algorithm can be adapted for use with the present disclosure. For example, the comparison logic in a text comparison algorithm that checks the equality of two characters can be replaced with logic that checks the equality of two rules.

Figure 7C:
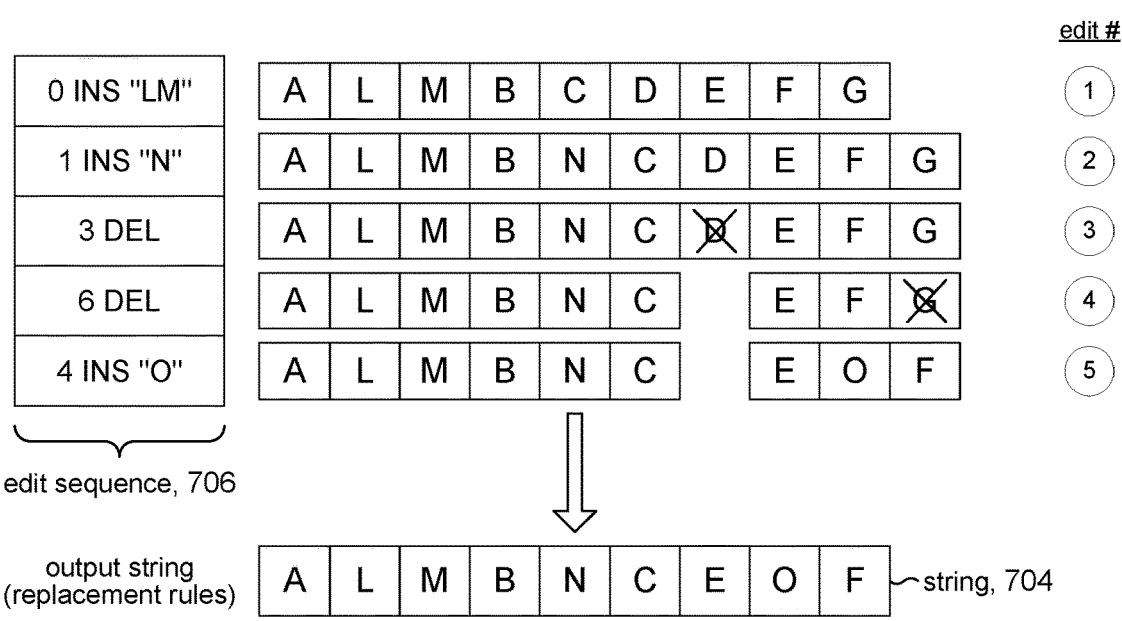

FIG. 7C shows an illustrative edit sequence 706 that can be generated from strings 702, 704 in accordance with some embodiments, where operations comprising the edit sequence can be applied to the old rules in string 702, as an input string, to produce, as an output string, the replacement rules in string 704. In some embodiments, the notation used in edit sequence 706 can be defined as follows:

x DEL—delete symbol x in the input string x INS "$_{s1\ s2\ s3}$, . . . "—insert the sequence of symbols "$_{s1\ s2\ s3}$ . . . " immediately after symbol x in the input string where—"symbol x" referred to in each operation always refers to the symbol position in the original input string before any of the operations are performed.

The figure illustrates the sequence of edit operations (by edit #) applied to string 702, showing intermediate results after each edit operation and the output string, namely string 704.

In some embodiments, the application programming interface (API) for the difference algorithm can have the form:

edit-sequence←diff (List1, List2, *compareRules)

where List1 and List2 can be pointers, respectively, to a list of old rules and a list of replacement rules, compareRules is a pointer to a function compareRules (Rule1, Rule2) that represents comparison logic for comparing Rule1 with Rule2. The function returns YES if the two rules match and NO otherwise, and edit-sequence references (e.g., is a pointer to) the set edit operations (e.g., edit sequence 706) to transform the List1 rules to List2 rules.

In some embodiments, the compareRules (Rule1, Rule2) function can ignore certain fields in the rules for comparison purposes. As explained above, for example, version bits in the rules can be ignored for comparison purposes. Accordingly, given two rules Rule1, Rule2 that are identical except for a difference in their version bits, the compareRules (Rule1, Rule2) function can ignore the data state of the version bits and deem the rules to be identical.

Operation 604 (FIG. 6)

At operation 604, network device 102 can determine a subsequence of rules that is common to both the old list of rules and the replacement list of rules. A subsequence of a given string can be defined as any sequence of symbols obtained by deleting zero or more symbols from the given string, without changing the sequence (order) of the symbols. Referring for a moment to FIG. 7A, a subsequence of string 702 can be the entire string, which is obtained by deleting zero symbols from string 702. Another subsequence of string 702 is "A B C D," obtained by deleting the symbols "E F G." A subsequence of a string can be non-contiguous. For example, the string "A B E G" is a subsequence of string 702 because it can be obtained by deleting the appropriate symbols. In each case, the sequence of the symbols as they appear in string 702 is unaffected. The string "A F B D E" would not be a subsequence because symbol F is in the wrong sequence.

Figure 8A:
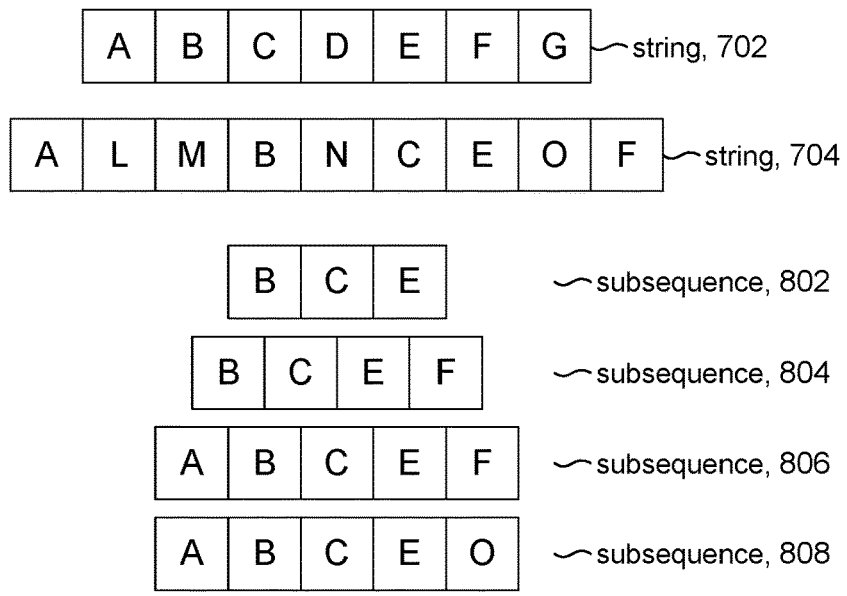
FIGS. 8A, 8B show examples of subsequences in connection with the processing described in FIG. 6.

A common subsequence can be defined as a subsequence that is common to two (or more) strings. FIG. 8A illustrates some examples of common subsequences using strings 702, 704 from FIG. 7A. For instance, subsequence 802 is a common subsequence; the symbols B C E appear in the same sequence (order) in both string 702 and string 704 even though the symbols B C E are not contiguous in either string 702 or string 704. Likewise with subsequence 804, the symbols B C E F appear in the same sequence, although not necessarily contiguously, in both strings 702, 704. Subsequence 806 constitutes the longest common subsequence between strings 702 and string 704. Subsequence 808 is an example of a subsequence in string 704, but is not a common subsequence between string 702 and string 704 because the symbol 'O' does not occur in string 702.

Figure 8B:
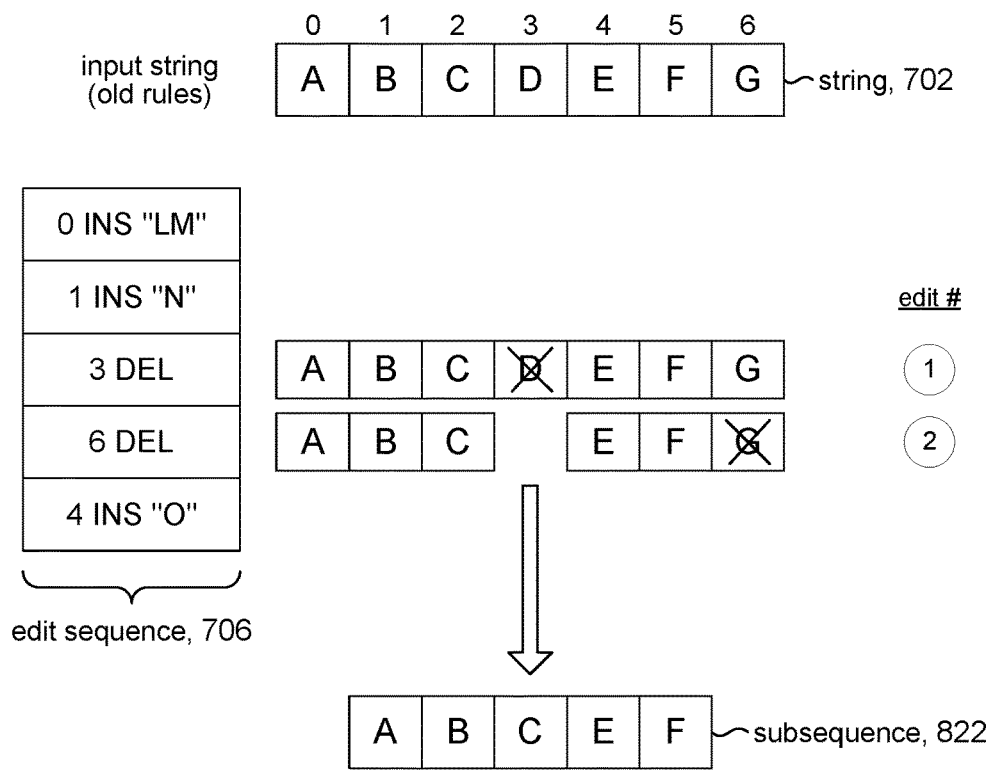

In some embodiments, a common subsequence between string 702 and string 704 can be generated by applying edit sequence 706 to the string 702, and in particular by applying only the delete operations in the edit sequence. With reference to FIG. 7C, for example, edit sequence 706 is generated by taking a difference between (input) string 702 and (output) string 704. A common subsequence between strings 702, 704 can be generated by applying the delete operations in edit sequence 706 to (input) string 702. FIG. 8B illustrates the sequence of operations (by edit #) with intermediate results, resulting in common subsequence 822 that represents a subsequence of rules found in both the old list (represented by string 702) and the replacement list (represented by string 704) in the same sequence (order), although not necessarily contiguously. Common subsequence 822 may also be referred to as the longest mergeable subsequence (LMS).

Operation 606 (FIG. 6)

Figure 9A:
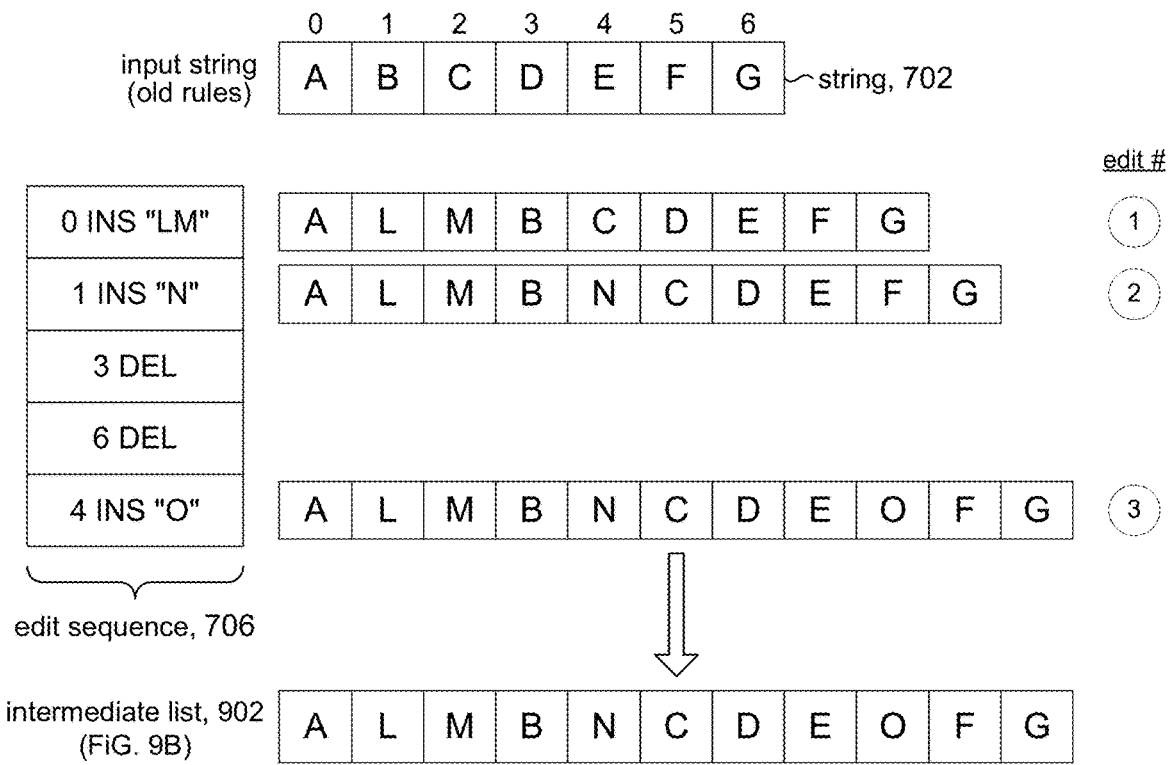
FIGS. 9A, 9B, 9C show an example of an intermediate list in connection with the processing described in FIG. 6.
Figure 9B:
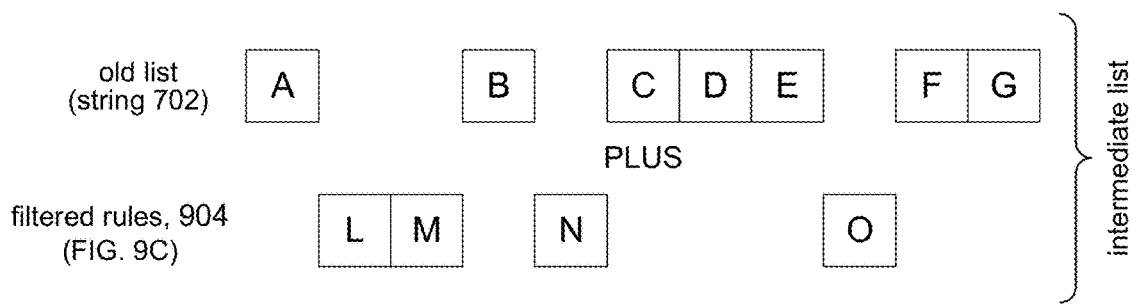
Figure 9C:
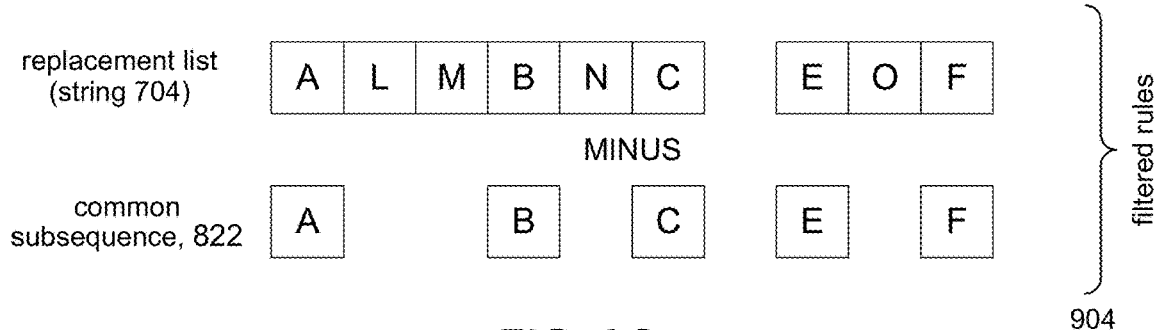

At operation 606, network device 102 can generate an intermediate list of rules that comprises rules from the old list (represented by string 702) and rules in the replacement list (represented by string 704) that are not also in common subsequence 822 (i.e., do not appear in the common subsequence). In some embodiments, for example, the intermediate list can be generated by applying edit sequence 706 to string 702, and in particular by applying only the insert operations in the edit sequence. Recall from FIG. 7C, edit sequence 706 can be generated by taking a difference between (input) string 702 and (output) string 704. An intermediate list can be generated by applying the insert operations in edit sequence 706 to (input) string 702. FIG. 9A illustrates the sequence of insert operations applied to string 702, resulting in intermediate list 902. The exploded view in FIG. 9B shows that intermediate list 902 comprises rules from the old list and a set of "filtered" rules 904. The exploded view in FIG. 9C, in turn, shows that filtered rules 904 comprise rules from the replacement list that are not also in common subsequence 822; in other words, rules from the replacement list with rules from the common subsequence removed (filtered out).

Operation 608 (FIG. 6)

At operation 608, network device 102 can generate a merged list of rules from the intermediate list of rules generated in operation 606. Recall that, in accordance with some embodiments, the version bits in the rules can be stored in a TCAM that supports three data states: '0', '1', and 'X' ("don't care", wildcard). In some embodiments, the merged list can be generated from intermediate list 902 by setting the version bit of each rule in the intermediate list to an appropriate data state ('0', '1', 'X'), according to the following convention:

- If a rule in the intermediate list appears only (is unique to) in the old list of rules or only in the replacement list of rules, then do not change the data state of the version bit of that rule in the intermediate list. For example, rule D in the intermediate list appears only in the old list; therefore, the version bit of rule D in the intermediate list remains unchanged. Likewise, rule M in the intermediate list appears only in the replacement list; therefore, the version bit of rule M in the intermediate list remains unchanged. Accordingly, the version bits for rules (e.g. rules D, G, FIG. 7C) in the intermediate list that occur only in the old list will always be different from the version bits for rules in the intermediate list that occur only in the replacement list (e.g., rules L, M, N, O, FIG. 7C).
- If a rule in the intermediate list appears in both the old list and the replacement list, then set the version bit of the rule in the intermediate list to the "don't care" (wildcard) data state, 'X'. Stated differently, rules in common subsequence 822 have their version bits set to the "don't care" (wildcard) data state, 'X'.

Figure 10:
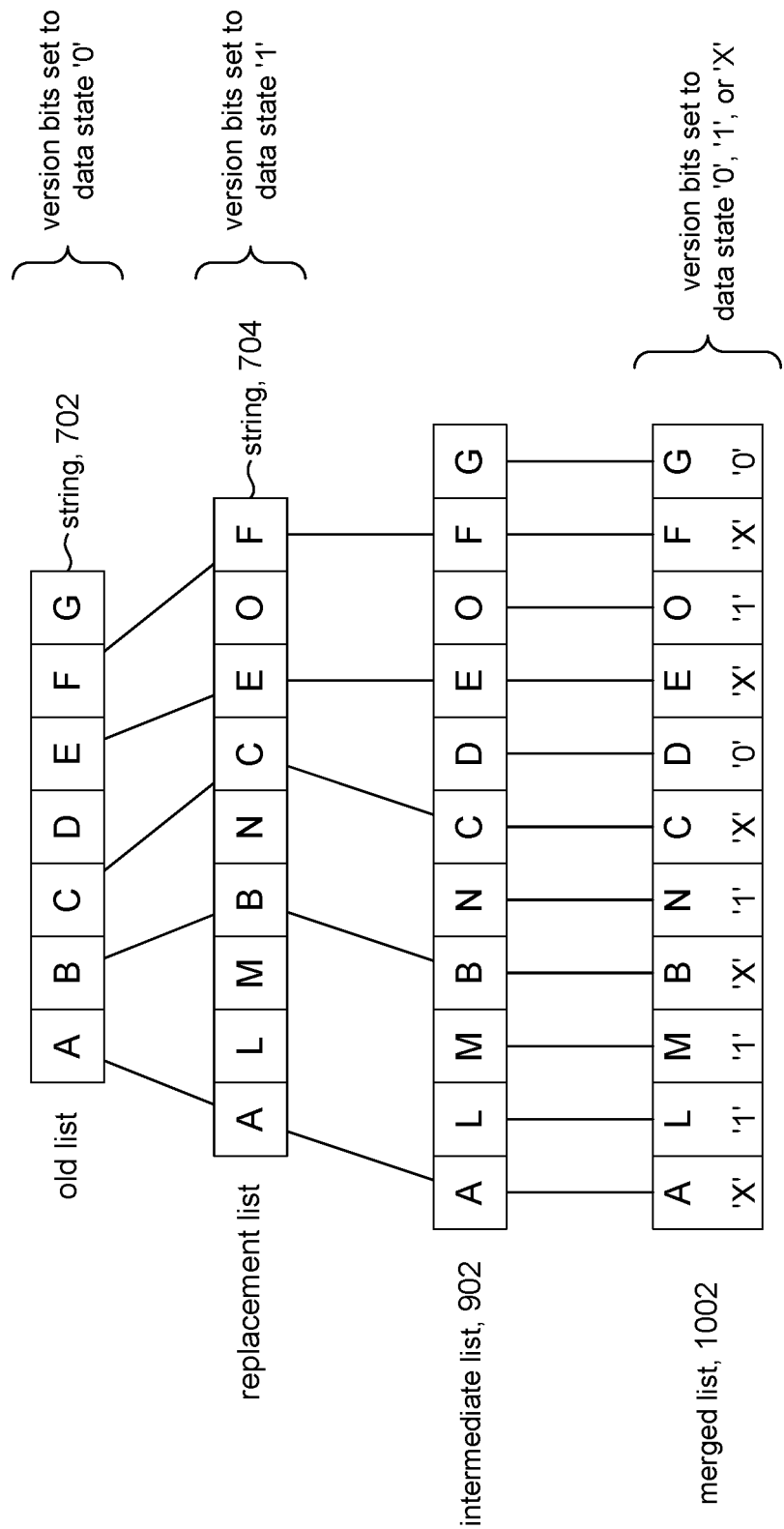
FIG. 10 shows an example of a merged list generated in accordance with the processing described in FIG. 6.

FIG. 10 illustrates an example using the old and replacement lists from FIG. 7A to format the intermediate list 902 from FIG. 9A to produce merged list 1002 in accordance with the above bit setting convention. In some embodiments, merged list 1002 comprises the same rules from intermediate list 902, but with their version bits set to the data state as described above. It is noted that the rules in merged list 1002 marked with "don't care" ('X') appear only in common subsequence 822; and so in some embodiments the common subsequence itself can be used to identify the "don't care" rules. It can be seen that the merged list is smaller in size (11 rules) than the combination of the old list (7 rules) and the replacement list (9 rules). This aspect of the present disclosure is discussed further below. The resulting merged list 1002 can be deemed ready for downloading to the TCAM, which will now be described in connection with FIGS. 11, 12, 13, and 14.

Figure 11:
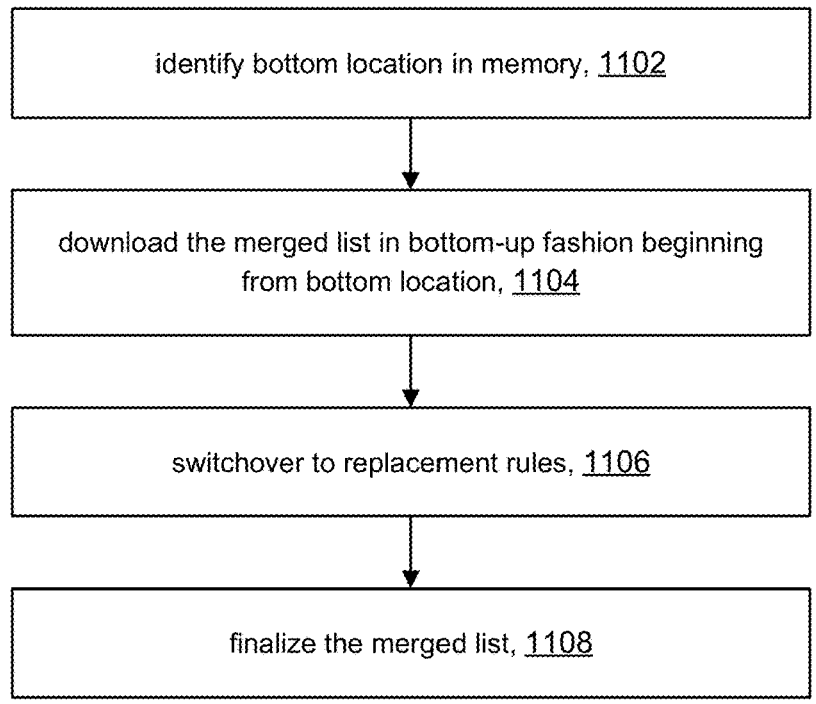
FIG. 11 illustrates an example of processing to install a merged list in a network device in accordance with the present disclosure.

Referring to FIG. 11, the discussion will now turn to a high level description of processing in network device 102 (e.g., by merged list installer 504 in rules updater 130, FIG. 5A) to download a merged list to a TCAM (e.g., 508) in accordance with the present disclosure. In some embodiments, for example, network device 102 can include computer executable program code, which when executed by a processor (e.g., 1502, FIG. 15), can cause the network device to perform processing in accordance with FIG. 11. The flow of operations performed by the network device is not necessarily limited to the order of operations shown. Illustrative details for the operations shown in FIG. 11 are provided with examples in FIGS. 12, 13, and 14.

Figure 12:
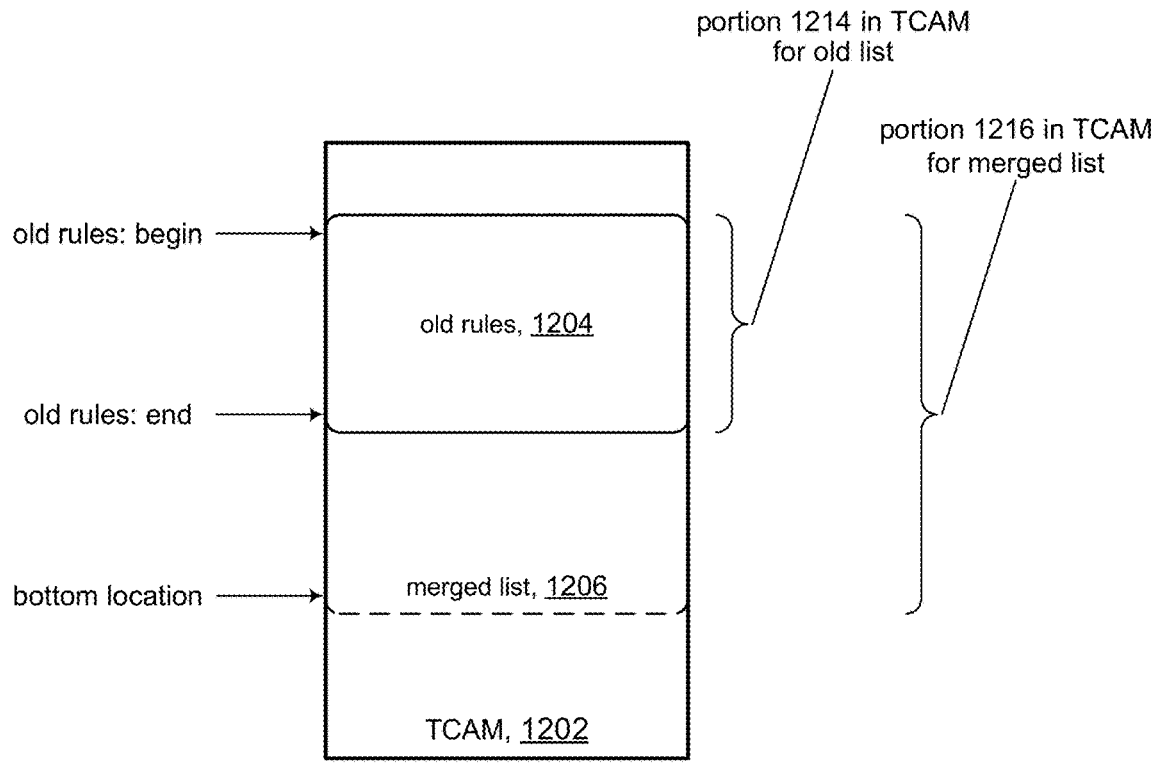
FIG. 12 shows an example of a ternary content-addressable memory (TCAM) in accordance with the processing described in FIG. 11.

At operation 1102, network device 102 can identify a bottom memory location in the TCAM as an initial step to set up for downloading the merged list. In accordance with the present disclosure, the merged list of rules produced in operation 608 (FIG. 6) can overlay the previously downloaded old list of rules. In some embodiments, the bottom memory location in the TCAM can be computed based on the starting location in the TCAM of the old list and the number of rules in the merged list. Referring to FIG. 12, for example, old rules 1204 are shown stored in portion 1214 of TCAM 1202. The old rules may be stored starting at memory location 0 in the TCAM, but in general can start anywhere in the address space of the TCAM. In accordance with the present disclosure, merged list 1206 can be downloaded to TCAM 1202 by overlaying the old rules. A bottom memory location in the TCAM can be computed generally in accordance with the following to define portion 1216 in the TCAM, which overlaps portion 1214, to store the merged list:

bottom location=begin address of old list+memory size of merged list

Figure 13:
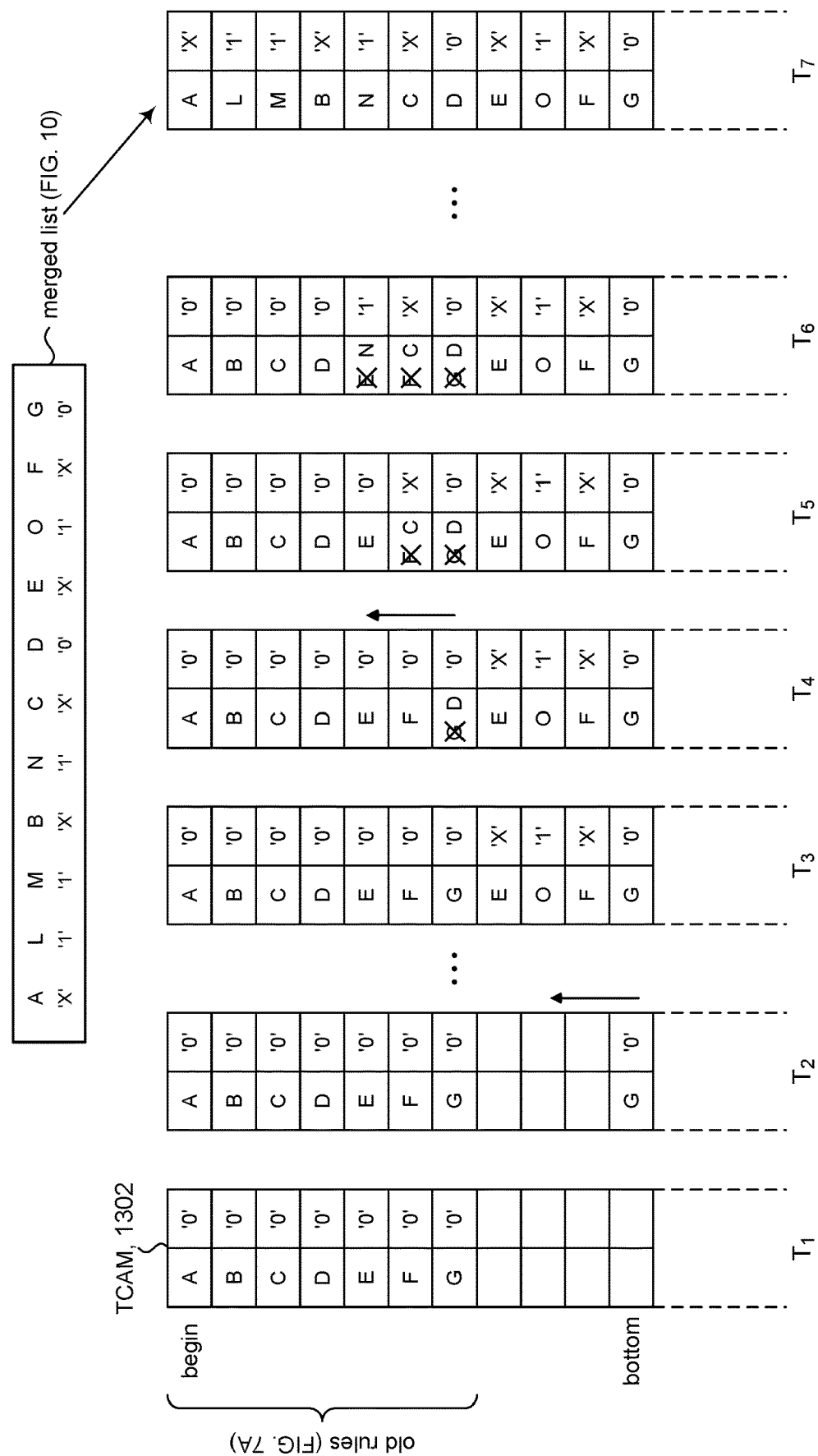
FIG. 13 shows an example of downloading a merged list into a TCAM in accordance with the processing described in FIG. 11.

At operation 1104, network device 102 can download (install) the merged list into the TCAM in bottom-up fashion, beginning from the bottom memory location determined at operation 1102. For example, the lowest priority rule in the merged list can be stored to the TCAM at the bottom memory location. The next lowest priority rule in the merged list can be stored in the next location up from the bottom memory location, and so on. The highest priority rule in the merged list would be the final rule to be stored in the TCAM. FIG. 13 shows an example of the fill sequence using the old list shown in FIG. 7A and the merged list shown in FIG. 10. At time T1, we see that TCAM 1302 contains only the old rules. The bottom memory location identifies where in TCAM 1302 the merged list will begin filling in from. At time T2, the lowest priority rule G in the merged list is loaded into the bottom memory location of TCAM 1302. This continues in bottom-up fashion as indicated by the arrow; at time T3, the four lowest priority rules from the merged list are stored in the TCAM. At time T4, the filling sequence begins to overwrite the old rules beginning from the lowest priority of the old rules. FIG. 13 illustrates a sequence of overwrites at times T4, T5, and T6, the old rules are successively overwritten in bottom-up fashion. At time T7, the entire merged list has been downloaded to the TCAM and the old rules have been overwritten; the merged list can be deemed to be downloaded. Operation of the TCAM during the download is discussed below.

At operation 1106, network device 102 can switchover to the replacement rules so that packet processing uses the replacement rules. In some embodiments, for example, logic in rules processing module 212 can then be controlled or signaled to match incoming packets with rules whose version bits are set to the data state corresponding to the replacement rules. Operation of the TCAM during a switchover is discussed below.

Figure 14:
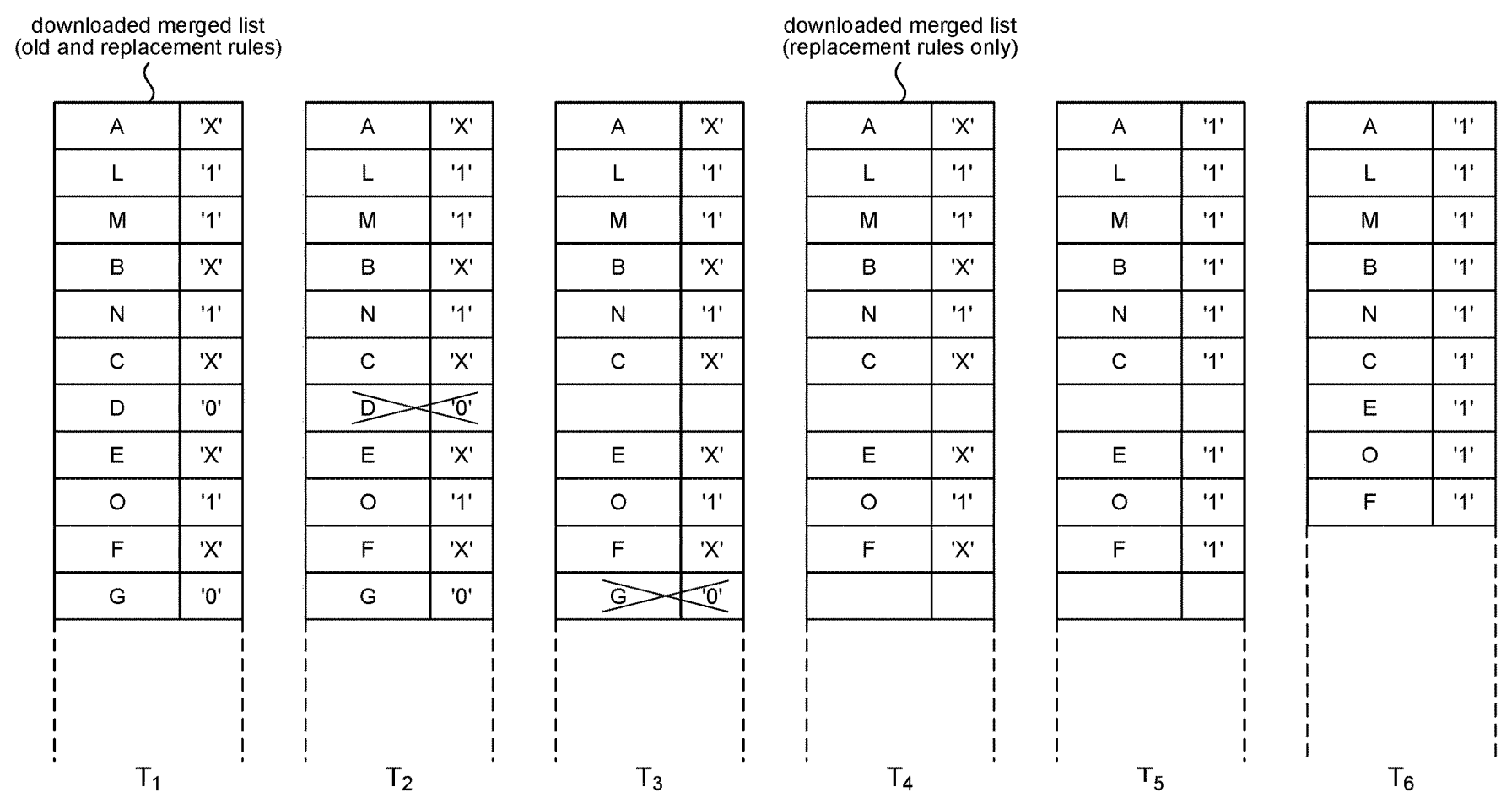

At operation 1108, network device 102 can finalize the downloaded merged list to complete the process of upgrading packet processing rules in a network device in accordance with the present disclosure. In some embodiments, the old rules can be deleted from the TCAM in top-down fashion, starting from the highest priority rule in the downloaded merged list. FIG. 14 shows an example of this sequence. Time T1 in FIG. 14 shows the downloaded rules (from time T7) in FIG. 13. At time T2, a top-down scan through the rules can begin from the highest priority rule (rule A) downward to search for a rule whose version bit has a data state that indicates an old rule, which in our running examples is data state '0'. At time T2, the first old rule is encountered at rule D. Rule D can be deleted, for example, by zeroing out entry(ies) in the TCAM associated with the rule. The downward scan continues, until at time T3 the next old rule is encountered at rule G and the rule is similarly deleted, and so on through the downloaded merged list. It is noted that with this deletion method, the order of deleting old rules need not occur in top-down order, and as can be seen the deletion order is not important.

At time T4, the TCAM contains only the replacement rules, albeit with some "holes" due to the deletion of the old rules. In addition, the version bits of the replacement rules are set to data state '1' or to data state 'X'. At time T5, another pass through the rules can be made to set all the version bits to data state '1'. This pass can be top-down or bottom-up.

At time T6, a compression operation can be performed to remove the holes (deleted old rules) in the TCAM in top-down fashion. When a hole is encountered, all rules below the hole up to the next hole can be moved up to fill the gap, one at a time in top to bottom order, thus ensuring ongoing packet processing remains unaffected (the operation is "hitless"). The finalization can be deemed complete, and upgrading the old rules with the replacement rules can be deemed complete. Operation of the TCAM during finalization is discussed below.

Figure 15:
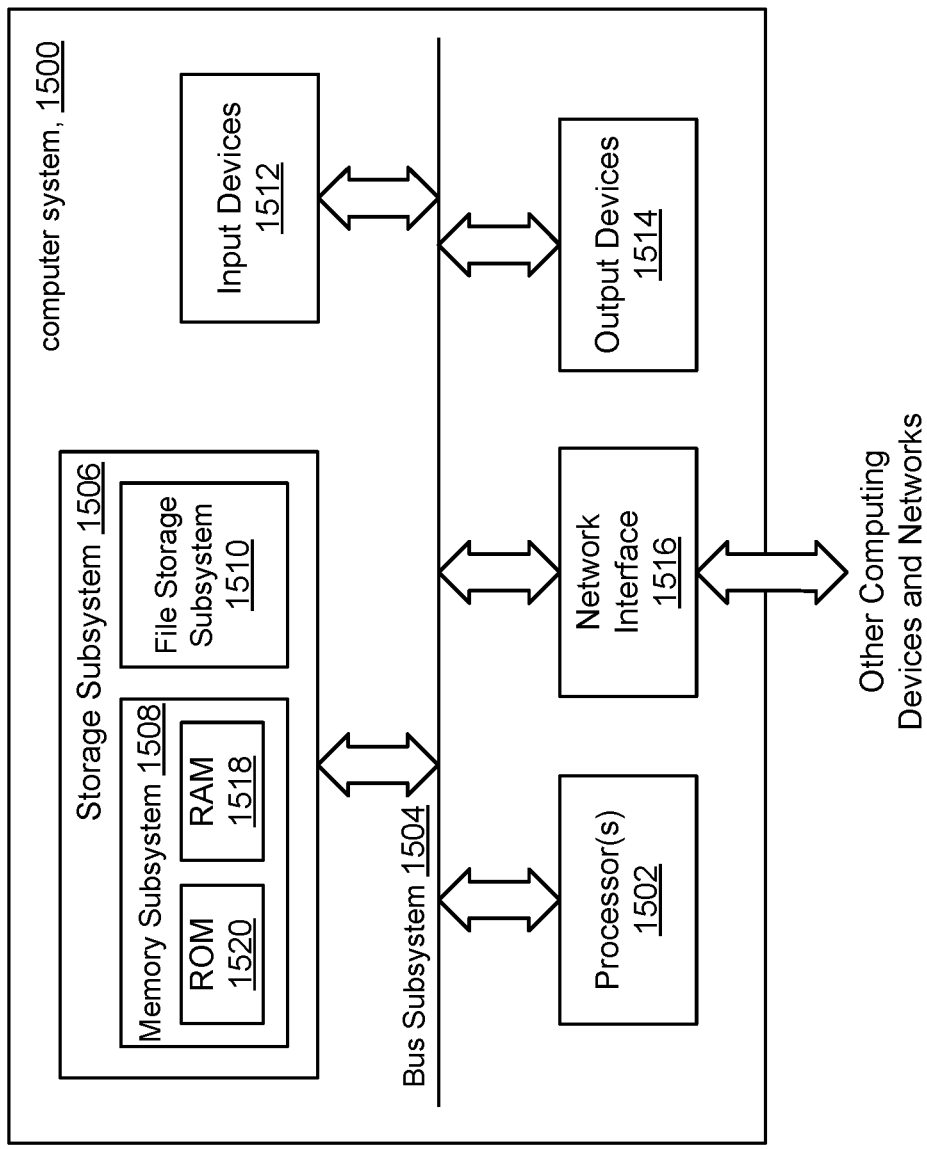
FIG. 15 shows a computer system that can be adapted in accordance with the present disclosure.

FIG. 15 depicts a simplified block diagram of an example computer system 1500 according to certain embodiments. Computer system 1500 can be used to embody rules updater 130 shown in FIG. 1, for example, via network device 102, data plane 126, control plane 128, and so on. As shown in FIG. 15, computer system 1500 includes one or more processors 1502 that communicate with a number of peripheral devices via bus subsystem 1504. These peripheral devices include storage subsystem 1506 (comprising memory subsystem 1508 and file storage subsystem 1510), user interface input devices 1512, user interface output devices 1514, and network interface subsystem 1516.

Bus subsystem 1504 can provide a mechanism for letting the various components and subsystems of computer system 1500 communicate with each other as intended. Although bus subsystem 1504 is shown schematically as a single bus, alternative embodiments of the bus subsystem can utilize multiple busses.

Network interface subsystem 1516 can serve as an interface for communicating data between computer system 1500 and other computer systems (e.g., device 14) or networks (e.g., network 12). Embodiments of network interface subsystem 1516 can include, e.g., an Ethernet card, a Wi-Fi and/or cellular adapter, a modem (telephone, satellite, cable, ISDN, etc.), digital subscriber line (DSL) units, and/or the like.

User interface input devices 1512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1500.

User interface output devices 1514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1500.

Memory subsystem 1506 includes memory subsystem 1508 and file/disk storage subsystem 1510 represent non-transitory computer-readable storage media that can store program code and/or data, which when executed by processor 1502, can cause processor 1502 to perform operations in accordance with embodiments of the present disclosure (e.g., FIGS. 6 and 11).

Memory subsystem 1508 includes a number of memories including main random access memory (RAM) 1518 for storage of instructions and data during program execution and read-only memory (ROM) 1520 in which fixed instructions are stored. File storage subsystem 1510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1500 is illustrative and many other configurations having more or fewer components than system 1500 are possible.

Packet Processing During Download (1104, FIG. 11)

As explained above and illustrated in FIG. 13, in accordance with the present disclosure replacement rules vis-à-vis the merged list can be downloaded in a region of the TCAM that overlaps with the old rules, thus overwriting the old rules; e.g., compare time T1 and time T7 in FIG. 13. Moreover, by writing the merged list to the TCAM in bottom up fashion, in accordance with the present disclosure, the old rules can continue to work while the merged list is being written despite that the old list of rules in the TCAM are being overwritten . . . . This is made possible because the merged list includes the old list. Referring back to FIG. 13, for example, suppose the old rules are marked with their version bits set to data state '0' as shown in the figure; i.e., incoming packets are matched against rules with version bit '0'. Consider the situation at time T4. Rule G from the old list is overwritten by rule D from the merged list; however, rule G from the merged list has now been written to the bottom in TCAM. Suppose an incoming packet that matches with rule G comes in. The TCAM will still be able to match the incoming packet to rule G. Notably, the TCAM logic will not try to match rule O because its version bit is set to '1'. This is relevant because if the incoming packet can be matched by both rule O and rule G but have different actions, rule O would have priority over rule G resulting in an incorrect action for the incoming packet.

Consider the situation at time T7 in FIG. 13, where download of the merged list is complete and the old list is completely overwritten. However, it can be seen that the old list still occurs in the downloaded merged list, and in the same order (i.e., rule priority is preserved). Moreover, rules from the replacement list are marked with version bit '1', so they will not be matched until switchover occurs. Rules in the old list are marked with either '0' or 'X' ("don't care"), and so the old rule will continue to be matched against incoming packets until switchover takes place. Thus processing in the TCAM can continue without delay (i.e., without taking a hit) despite overlaying the old rules with a merged list in accordance with the present disclosure.

Packet Processing at Switchover (1106, FIG. 11)

Referring to time T7 in FIG. 13, when the merged list has been downloaded to the TCAM a switchover to the replacement rules can be made. It can be seen that the merged list includes the replacement rules (e.g., compare with string 704 in FIG. 10). Rules in the replacement list are marked with either '1' or 'X' ("don't care"). When switchover occurs, rules marked with '1' or 'X' will be matched against incoming packets. Thus processing in the TCAM can continue without delay (i.e., without taking a hit) with the replacement rules.

Packet Processing During Finalization (1108, FIG. 11)

It can be seen from FIG. 14 that the finalization process does not affect the priority of the replacement rules (marked by '1' and 'X'). At times T2 and T3, for example, old rules D and G are deleted, leaving only the replacement rules. Between times T4 and T5, rules marked with 'X' are set to '1', which does not affect the matching of incoming packets with the replacement rules. At time T6 holes created by deleting the old rules can be removed, again without impact to the matching of incoming packets with the replacement rules.

The discussion will now turn to a description for producing a merged list in accordance with other embodiments of the present disclosure to reduce convergence time in producing the merged list. In order to accommodate the discussion that follows, the following additional terminology is introduced:

policy, traffic policy, access control list (ACL)—An ACL is a list of "rules" that are specified by a user such as a network administrator. The order of rules in an ACL is determined by the user. A network device can be configured with a collection of one or more ACLs. Each ACL can be identified by an identifier referred to herein as an "aclKey."

rule—A rule specifies match fields (match criteria) for matching a packet (e.g., IP or MAC address, port, etc.) and one or more actions (e.g., redirect packet, log information, drop packet, etc.) performed in response to matching a packet. A rule can be identified by a rule-name. The match field in a rule can include multiple instances of a given field type (such as src IP, dest IP, src MAC, dest MAC, src port, dest port, etc.); e.g., a match field can specify multiple src ports, multiple src IPs, and so on. Merely to illustrate this point, a match field can include "(src port=16|src port=32) && (dest IP=128.100.0.0/24|dest IP=192.200.0.0)"

filter—Whereas a rule is expressed in human readable form, filters represent a "compiled" version of the rule that is expressed in binary form and is suitable for programming in the TCAM. In some embodiments for example, one or more filters can be generated by computing a cross-product of the rule's constituent match fields. Using the example above, the following filters can be produced:

src port=16 && dest IP=128.100.0.0/24
src port=16 && dest IP=192.200.0.0
src port=32 && dest IP=128.100.0.0/24
src port=32 && dest IP=192.200.0.0

Figure 16:
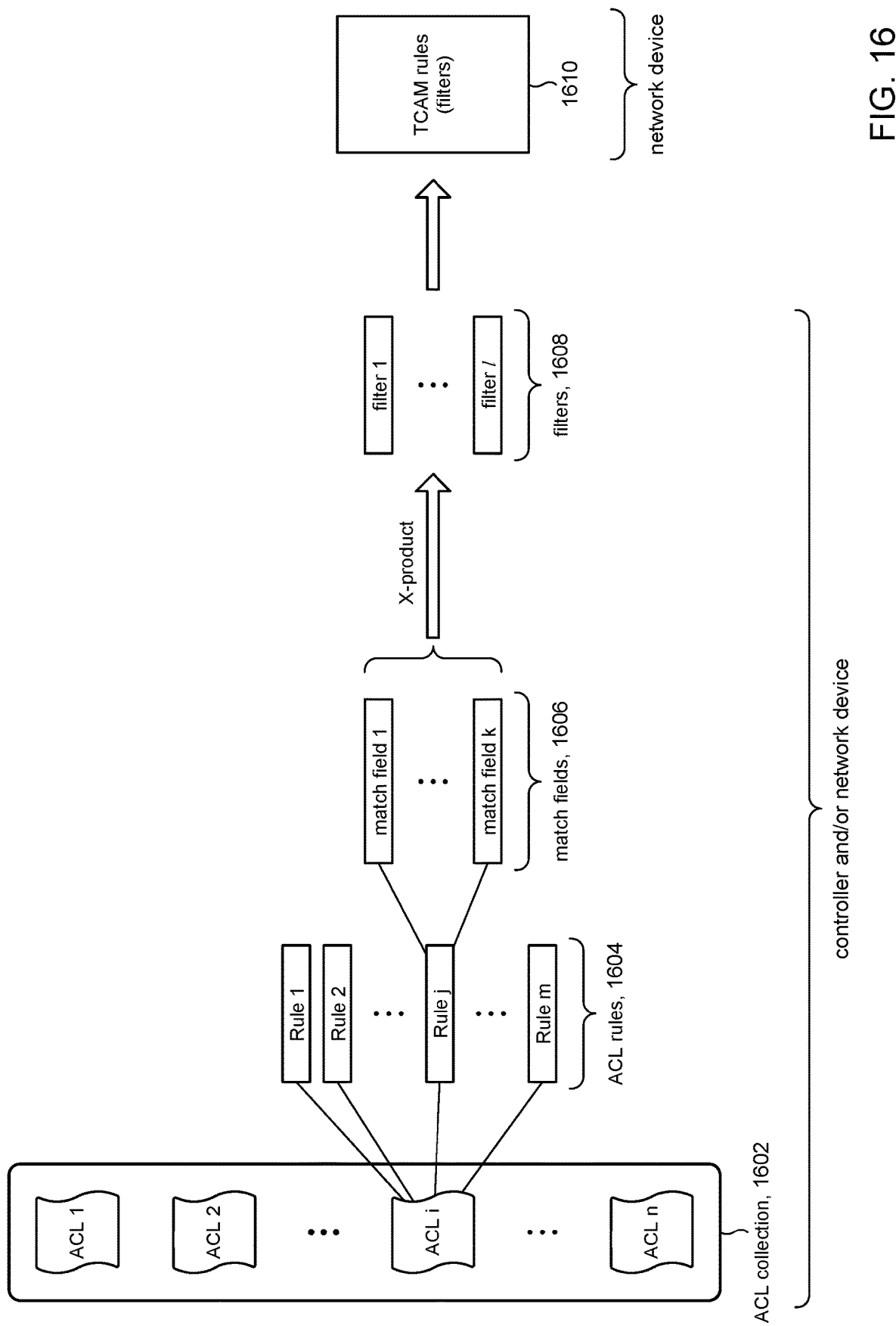
FIG. 16 illustrates general processing of ACLs to generate filters for storage in a TCAM.

FIG. 16 illustrates the hierarchical relationship between ACLs, rules, and filters. The example shows a collection 1602 of one or more ACLs. Each ACL (e.g., ACL i) comprises one or more rules 1604. Each rule (e.g., rule j) comprises one or more match fields (criteria) 1606. The match fields can be compiled to produce one or more filters 1608 that can then be programmed or otherwise installed in TCAM 1610 in the network device.

Merely to illustrate an example of filter generation, suppose a rule comprises the following match fields (criteria):
field 1: SIP= [1.1.1.1/32 or 2.2.2.2/32]
field 2: IP-protocol=[TCP or UDP]

This rule comprises two match fields: field 1, field 2. A packet is deemed to match the rule when the packet's data fields match both match fields. In other words, the rule will match a packet that is a TCP or UDP protocol and has a source IP address of 1.1.1.1/32 or 2.2.2.2/32. Although not shown, it is understood that the rule includes an action set comprising one or more actions. Actions in the action set are invoked on packets that match the above criteria.

A cross-product of field 1 and field 2 yields the following four filters which can be expressed in a binary form that is suitable for programming in a TCAM:
filter 1: SIP=1.1.1.1/32 && IP=TCP
filter 2: SIP=1.1.1.1/32 && IP=UDP
filter 3: SIP=2.2.2.2/32 && IP=TCP
filter 4: SIP=2.2.2.2/32 && IP=TCP It can be seen that the set of filters is semantically equivalent to the match fields in that each filter matches the same packets as do the match fields. It is understood that each filter is associated with the action set of the rule from which the filter was generated, as shown for example in FIG. 3. If a packet matches filter 1 or filter 2 or filter 3 or filter 4, then the action set will be invoked.

As evidenced by the description in connection with FIGS. 1-15, it is common to refer to filters as "TCAM rules" in the context of a TCAM. However, to avoid overloading use of the term "rule," the remaining discussion will refer to TCAM rules as "filters." The term "rule" will refer to the rules in an ACL from which filters are generated.

FIG. 16 shows that in some embodiments, the processing to generate filters 1608 from ACL collection 1602 can be performed in a controller (e.g., 10, FIG. 1). The resulting filters 1608 can then be downloaded from the controller to the network device to be programmed or otherwise stored in the TCAM 1610. In other embodiments, the controller can download ACL collection 1602 to the network device which can then generate and store filters 1608 in the TCAM 1610.

The discussion will now turn to a high level description of processing in network device 102 (e.g., by merged list generator 502 in rules updater 130, FIG. 5A) to produce a merged list in accordance with the present disclosure. In accordance with some embodiments, operations for producing a merged list need only compare the same-named rules between same-named ACLs in an already installed collection of ACLs and a new collection of ACLs. Rules that occur only in one ACL collection or the other can be written to the merged list without having to perform a comparison operation between ACL collections; i.e., their corresponding filters can be written to the merged list.

Figure 17:
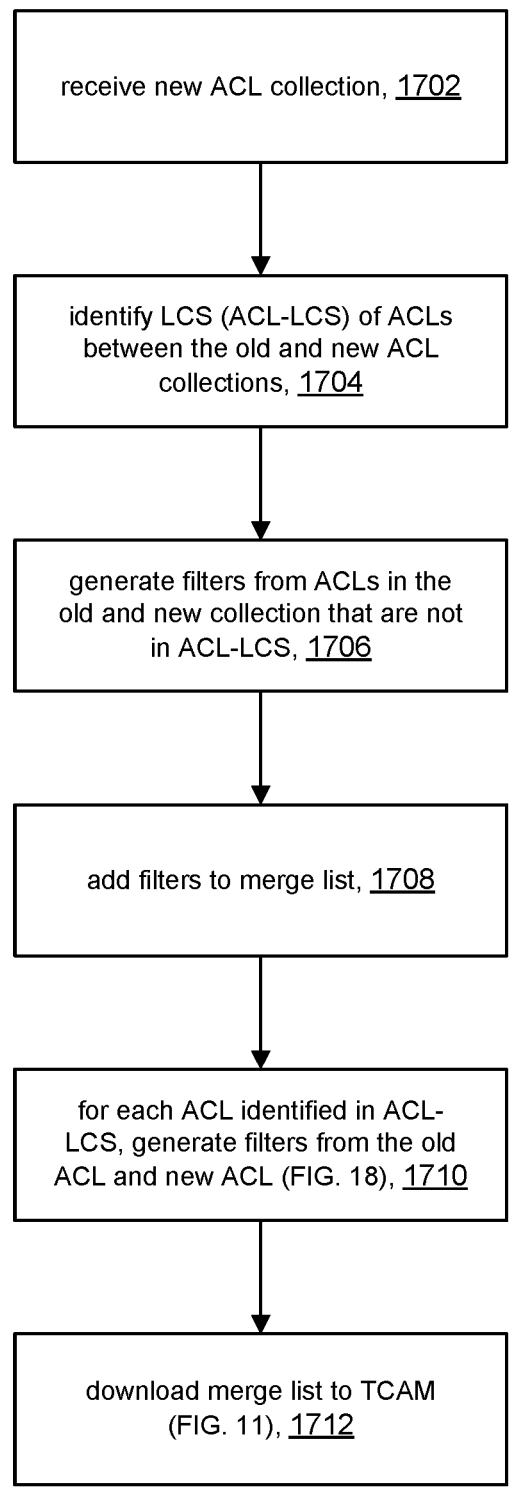
FIG. 17 describes operations to generate filters in accordance with the present disclosure.

FIG. 17 illustrates an example of processing in network device 102 (e.g., by merged list generator 502 in rules updater 130, FIG. 5A) to produce a merged list in accordance with the present disclosure. The merged list, for example, can be memory such as DRAM in the control plane of the network device. In some embodiments, for example, network device 102 can include computer executable program code, which when executed by a processor (e.g., 1502, FIG. 15), can cause the network device to perform processing in accordance with FIG. 17. Although the operations of FIG. 17 are described with respect to a network device, it will be understood that in some embodiments, at least some operations can be performed in a controller (e.g., 10, FIG. 1).

At operation 1702, the network device can receive a new ACL collection to replace a previously installed old ACL collection. In some embodiments, the network device can retain (e.g., in some suitable persistent memory) the ACL collection of ACLs from which the currently installed TCAM filters were generated (e.g., old rules 18, FIG. 1). This ACL collection can be referred to as the old ACL collection. The network device can receive the new ACL collection from which the new filters (e.g., replacement rules 16) can be generated to replace the installed filters. Each ACL in a collection can be identified by a suitable identifier called an ACL key.

At operation 1704, the network device can identify a longest common subsequence (LCS) of ACLs that is common between the old collection and the new collection; call this list of ACLs the ACL-LCS. A subsequence can be contiguous or non-contiguous. Consider for example to two strings:

string 1—ABCDEFMN
string 2—YZBCDEWQFRS

Examples of contiguous subsequences that are common between string 1 and string 2 include "B", "B C", "CD", "B C D", and others. Examples of non-contiguous subsequences that are common between string 1 and string 2 include "E F" and "D E F" because "E" and "F" in string 2 are not contiguous. The longest common subsequence between string 1 and string 2 is
"BCDEF".

In some embodiments, the ACLs in a collection can be deemed to be independent of one another. In other words, no ordering requirement is imposed on the list of ACLs in a collection; for example, the ACL collection {ACL1, ACL2, ACL3} and the ACL collection {ACL2, ACL3, ACL1} are considered the same collection. In accordance with the present disclosure, because the ACLs in a collection are independent of one another, the ACL keys in each collection can be sorted; e.g., in ascending or descending order. A suitable list intersection algorithm can be used to identify the longest common subsequence of ACL keys between the sorted collections. Because both collections are sorted, an intersection algorithm that exhibits O(N) complexity can be used to compute the LCS, where N is the number of ACLs in the old collection plus the number of ACLs in the new collection. Each ACL key in the resulting ACL-LCS list is a key that is in both the old and new collections.

The concept of "complexity" of an algorithm is known. Briefly, an algorithm's complexity is a measure of how much time or memory the algorithm would require to complete for a given input of size N. Time complexity refers to how much time an algorithm would require, and space complexity refers to how much memory an algorithm requires. An algorithm that exhibits O(N) time complexity indicates that the time to run the algorithm grows linearly as the input size (N) increases. An algorithm that exhibits $O(N^2)$ time complexity indicates that the time to run the algorithm increases exponentially as the input size increases.

At operation 1706, the network device can generate filters from ACLs that are not in the ACL-LCS list. For example, we can generate filters from ACLs in the old collection whose ACL keys are not listed in ACL-LCS. Likewise, for any ACLs in the new collection whose ACL keys are not listed in ACL-LCS, we can generate filters from those ACLs.

At operation 1708, the network device can add the filters generated at operation 1706 to the merged list, including setting the version bit (described above) in each filter to an appropriate logic state; e.g., logic '1' or logic '0'. Recall from the discussion above that the system-level version bit is used to provide make-before-break switchover of old (already-programmed) filters (rules) to new filters. The system-level version bit is toggled between '0' and '1' with each update of the filters. With respect to the present disclosure, if the filter is generated from an old ACL, then the "appropriate" state of the version bit is the current state of the system-level version bit and the filter is written to the merged list with the current state of the version bit. On the other hand, if the filter is generated from a new ACL, then the "appropriate" state of the version bit is obtained by toggling the current state of the system-level version bit and the filter is written to the merged list with the toggled value.

At operation 1710, the network device can compare and generate filters from rules in ACLs that are identified in the ACL-LCS list. Each ACL key that is listed in ACL-LCS refers to an ACL that is in both the old ACL collection and in the new ACL collection. For each ACL key that is identified in ACL-LCS, a pair of ACLs comprising the identified ACL in the old collection and the identified ACL in the new collection can be processed according to FIG. 18 to generate additional filters that can be added to the merged list.

At operation 1712, the network device can download, program, or otherwise install the resulting merged list to the TCAM. In some embodiments, for example, the merged list can be processed in accordance with FIG. 11 to replace the old filters with the new filters in the merged list. Processing can be deemed complete.

Figure 18:
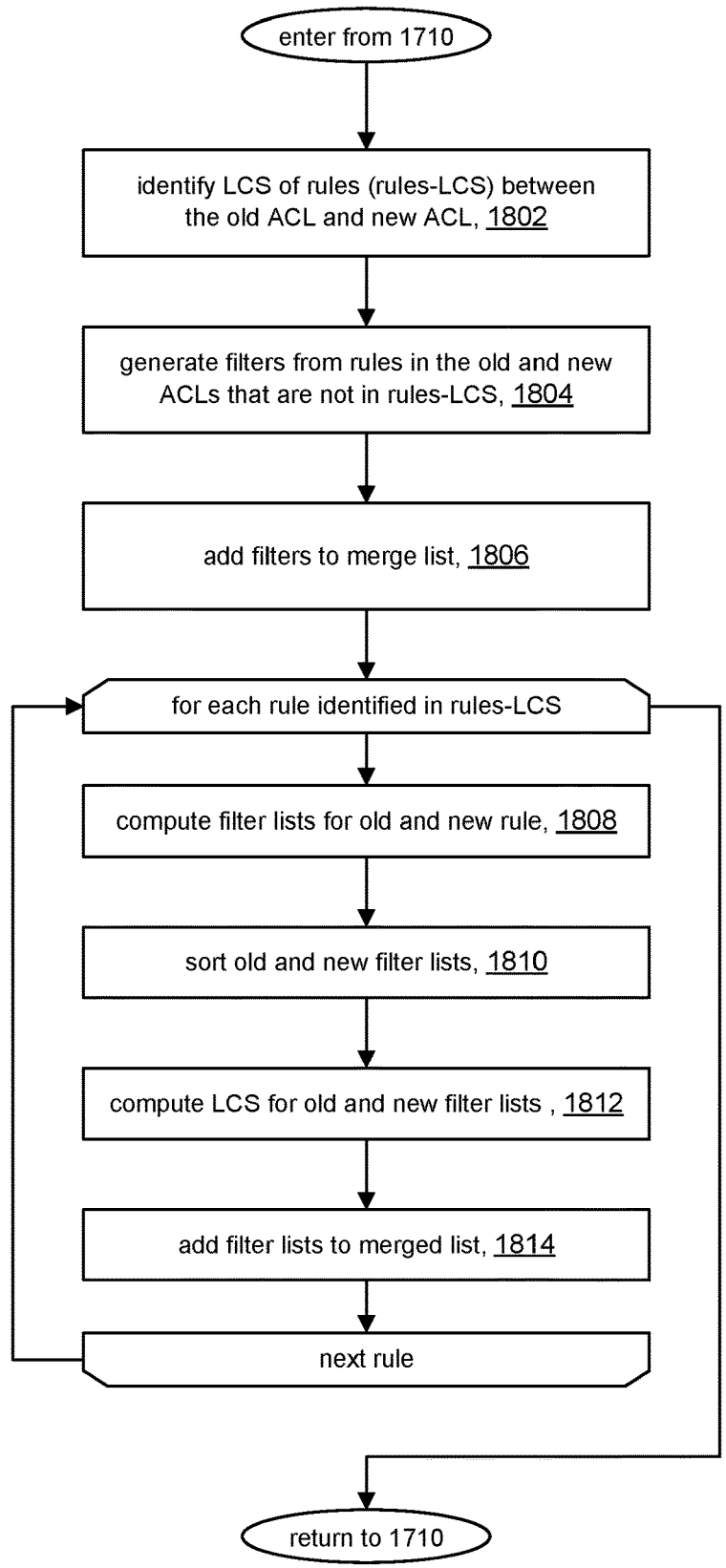
FIG. 18 describes operations to generate filters in accordance with the present disclosure.

Referring to FIG. 18, the discussion will now turn to a high level description of processing in network device 102 (e.g., by merged list generator 502 in rules updater 130, FIG. 5A) to generate filters from rules in a pair of old and new ACLs in accordance with the present disclosure. As noted above in operation 1710, each pair of ACLs, one from the old collection and one from the new collection, can be processed to generate filters that are then added to the merged list. In some embodiments, network device 102 can include computer executable program code, which when executed by a processor (e.g., 1502, FIG. 15), can cause the network device to perform processing in accordance with FIG. 18. Although the operations of FIG. 18 are described with respect to a network device, it will be understood that in some embodiments, at least some operations can be performed in a controller (e.g., 10, FIG. 1).

At operation 1802, the network device can compare rules in an old ACL and a corresponding new ACL to identify a longest common subsequence (LCS) of rules that is common to both ACLs. Recall from operation 1710 that the old ACL and the corresponding new ACL constitute a pair of respective ACLs from the old and new ACL collections that are identified in the ACL-LCS list.

Recall from FIG. 16 that each ACL comprises a collection of rules. A suitable list intersection algorithm can be used to compare the old and new ACLs and identify the longest subsequence of rules (e.g., vis-à-vis their rule names) that is common to both the old and new ACLs; call this list of rules the rules-LCS. The rules in an ACL reflect the policies of the organization for how packets are processed, for example, in terms of firewalls, logging, packet redirection, and so on. The order that those rules occur in the ACL are generally determined by a user (e.g., network administrator) and is provided to the network device in a suitable configuration file. Accordingly, the rules in the old and new ACLs cannot be sorted prior to computing the LCS. Because the rules cannot be sorted, available intersection algorithms for computing the LCS generally do not exhibit O(n) complexity but rather are more compute and time intensive. In some embodiments, the Meyer difference algorithm, described above, can be used to compare the old and new ACLs. The Meyer difference algorithm exhibits O(ND) complexity, where N is the number of rules in the old ACL plus the number or rules in the new ACL, and D is the number of rules that are common between the old and new ACL but in unsorted order.

At operation 1804, the network device can generate filters from rules that are not in the rules-LCS list.

At operation 1806, the network device can add the filters generated at operation 1804 to the merged list, including setting the version bit (described above) in each filter to an appropriate logic state (e.g., logic '1' or logic '0') as described above. For example, if the filter is generated from a rule in an old ACL, then the "appropriate" state of the version bit is the current state of the system-level version bit and the filter is written to the merged list with the current state of the system-level version bit. On the other hand, if the filter is generated from a rule in a new ACL, then the "appropriate" state of the version bit is obtained by toggling the current state of the system-level version bit and the filter is written to the merged list with the toggled value.

For each rule identified in rules-LCS, filters are generated from the identified rule in the old ACL and from the identified rule in the new ACL, and then added to the merged list. In some embodiments, the network device can generate filters in accordance with operations 1808 to 1814:

At operation 1808, the network device can compute a filter list from the old rule and a filter list from the new rule. The filter list can be generated by taking a cross-product of the match fields comprising the rule. The filter list comprises a list of filters resulting from the cross-product operation. As noted above, for example, suppose a rule contains the following match filers:
    field 1: SIP=[1.1.1.1/32 or 2.2.2.2/32]
    field 2: IP-protocol=[TCP or UDP]
A cross-product of these match filters can result in the following filter list:
    filter 1: SIP=1.1.1.1/32 && IP=TCP
    filter 2: SIP=1.1.1.1/32 && IP=UDP
    filter 3: SIP=2.2.2.2/32 && IP=TCP
    filter 4: SIP=2.2.2.2/32 && IP=TCP At operation 1810, the network device can sort each filter list. In some embodiments, for example, the filter lists can be sorted according to IP address. The specific sort criterion (sort key) will depend on the data fields that comprise the filters. In general, the sort criterion can be any suitable ordered list of data fields in the filter.

At operation 1812, the network device can compute a filter LCS that identifies filters that are common to the filter list from the old rule and the filter list from the new rule.

At operation 1814, the network device can add the filters to the merged list. In some embodiments, for example, filters not in the filter LCS can be added to the merged list with the appropriate version bit set as described above. Filters that are in the filter LCS can be added to the merged list with the version bit masked off (i.e., set to the "don't care" state, logic state 'X') as explained above.

Processing can return to operation 1710 (FIG. 17) after all the rules in the rules-LCS are processed.

Figure 19A:
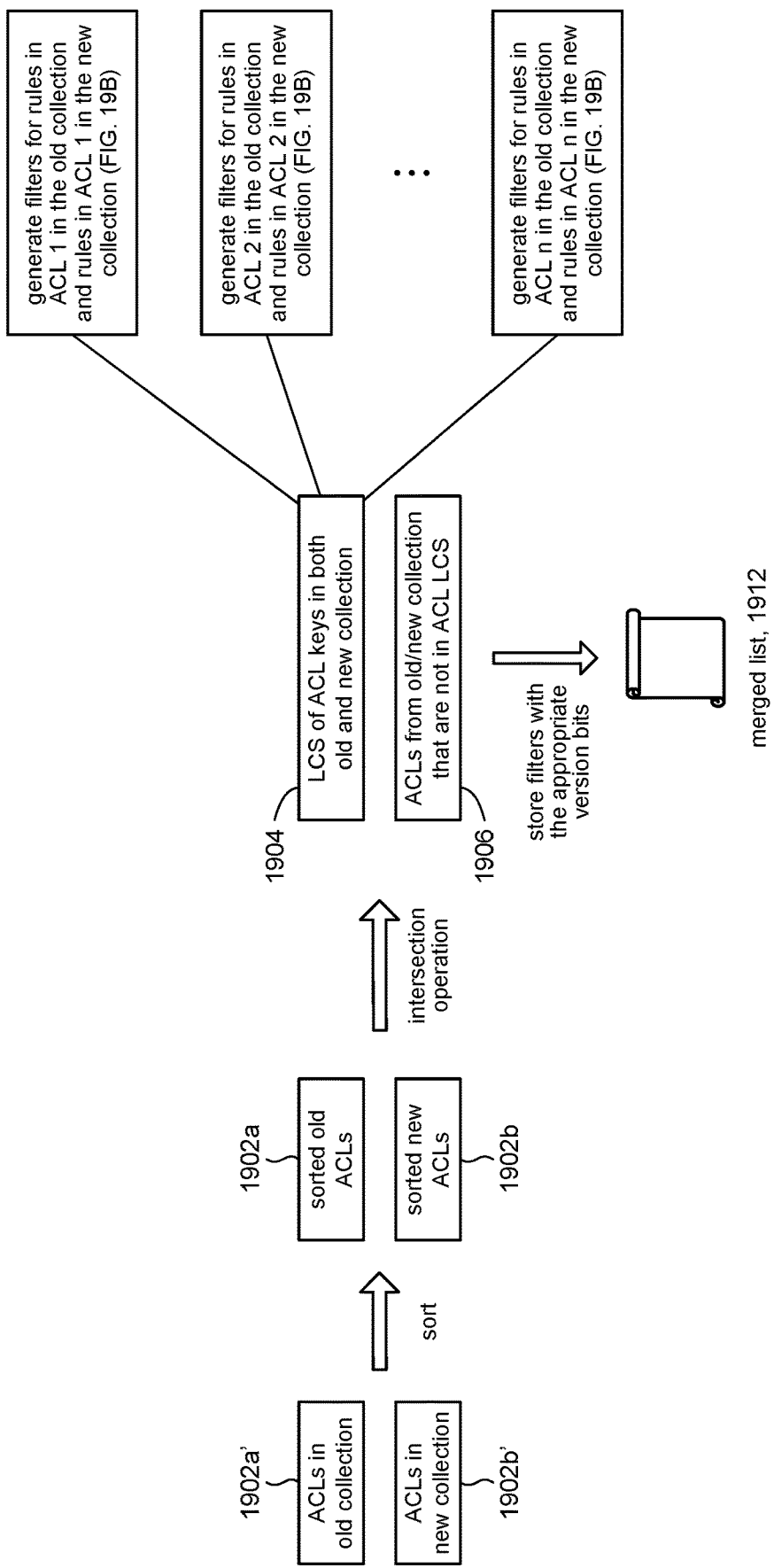
FIGS. 19A, 19B, 19C illustrate processing of ACLs to generate filters in accordance with the present disclosure.
Figure 19B:
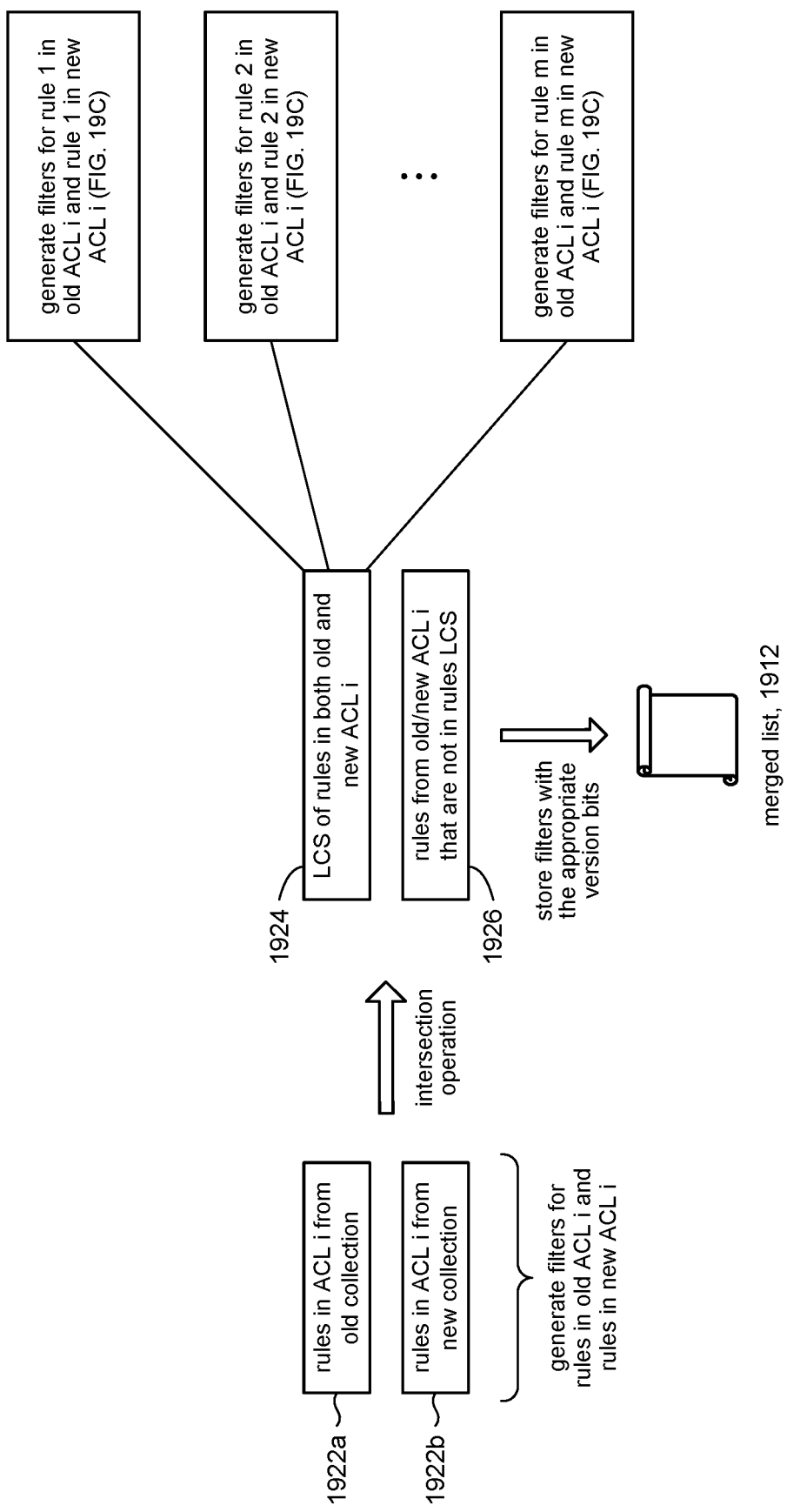
Figure 19C:
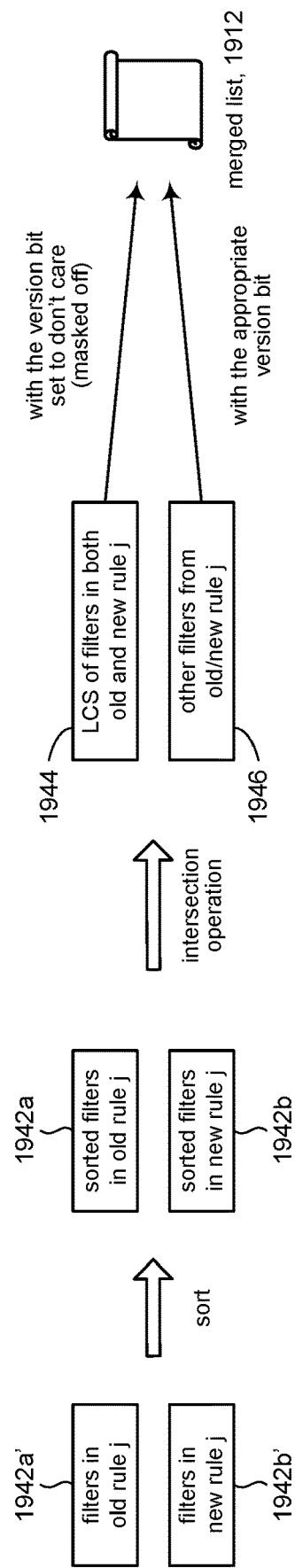

Referring now to FIGS. 19A, 19B, and 19C, the foregoing operations in FIGS. 17 and 18 are illustrated in block diagrams to provide additional context for the present disclosure. FIG. 19A, for example, shows two collections of ACLs: an old collection 1902a' and a new collection 1902b'. The old collection 1902a' may represent ACLs that have previously been translated or otherwise converted into filters and programmed in the network device (e.g., in a TCAM). The new collection 1902b' can represent a new set of rules to replace the old collection. The collections can be provided by a user such as a network administrator.

Each collection can be sorted (e.g., in ascending or descending order) according to a suitable sort algorithm to produce a sorted old collection 1902a and a sorted new collection 1902b. An intersection operation is applied to the sorted ACL collections, to produce ACL-LCS list 1904 comprising a list ACL identifiers that occur in both the old and new collection. For example, if ACL-LCS list 1904 comprises the names (ACL keys) "ACL 1", "ACL 2", . . . "ACL n", this means that an ACL named "ACL 1" occurs in both the old and new ACL collections; likewise for the names ACL 2 to ACL n.

ACL group 1906 represents ACLs whose identifiers occur only in the old collection or only in the new collection. As shown in FIG. 19A, the rules in ACL group 1906 can be translated or otherwise converted to filters without further processing, and written to merged list 1912 with the appropriate version bits set as described above.

Regarding ACL-LCS 1904, for each ACL identifier listed, the corresponding ACL in the old collection and the corresponding ACL in the new collection are further processed according to FIG. 19B. As shown in FIG. 19A, the ACL in the old collection named "ACL 1" and the ACL in the new collection named "ACL 1" are processed according to FIG. 19B. Likewise, ACL 2 in the old collection and ACL 2 in the new collection are processed according to FIG. 19B, and so on to ACL n.

Referring to FIG. 19B, the discussion now turns to processing of a pair of ACLs, one from the old collection and one from the new collection, identified by the name "ACL i". The figure shows rules 1922a in ACL i from the old collection and rules 1922b in ACL i from the new collection. A suitable intersection operation is applied to produce rules LCS list 1924 comprising a list that identifies rules whose identifiers (e.g., rule 1, rule 2, . . . rule m) occur in both the old ACL i and the new ACL i. Notably, rules 1922a and rules 1922b are not sorted prior to the intersection operation.

The rules group 1926 represents rules that occur only in the old ACL i or only in the new ACL i. As shown in FIG. 19B, the rules in rules group 1926 can be translated or otherwise converted to filters without further processing, and written to merged list 1912 with the appropriate version bits set as described above.

Regarding rules LCS 1924, for each rule identifier listed in rules LCS, the rule in the old collection and the rule in the new collection that are identified by the rule identifier are further processed according to FIG. 19C. For instance, the rule named "rule 1" in the old collection and the rule named "rule 1" in the new collection are processed according to FIG. 19C. Likewise, rule 2 in the old collection and rule 2 in the new collection are processed according to FIG. 19C, and so on to rule m.

Referring to FIG. 19C, the discussion now turns to processing of a pair of rules, both identified by the name "rule j", one from the old collection and one from the new collection. FIG. 19C represents filter sets 1942a' and 1942b' generated from the old and new rules, respectively. Old filter set 1942a' comprise filters generated (e.g., by cross-product) from the old rule and new filter set 1942b' are filters generated from the new rule.

Each filter set can be sorted according to a suitable sort algorithm to produce a sorted old filter set 1942a and a sorted new filter set 1942b. An intersection operation can be applied to the sorted filter sets, to produce filter LCS list

1944 comprising a list filters that occur in both the old and new filter sets. As noted above, because the old and new filter sets are sorted, an intersection algorithm that exhibits O(N) complexity can be used to compute the filter LCS list. It is further noted that the filters can be sorted because there is no implied ordering among the filters in the filter set generated by the cross product (the filters will be mutually exclusive-a packet will match only one of the filters in the set).

Filter group 1946 comprise filters that come from only the old rule or the new rule. Filters not present in filter LCS 1944 are added to merged list 1912 with the version bit set as described above. Filters in the filter LCS are added to the merged list with the version bit masked off as described above; i.e., set to the "don't care" state.

FIGS. 20A-20D show an example to illustrate the operations described above. FIG. 20A shows an initial configuration comprising an old collection 2002 of ACLs and a new collection 2004 of ACLs. The ACLs in each collection are identified by an ACL key. Each ACL comprises a set of one or more rules, which are identified by a rule name. Each rule is shown with its corresponding filters, for example, generated by taking a cross-product of its match fields (not shown). The ACLs in both collections are shown in sorted order. An LCS between the old and new collections is:

ACL-A, ACL-B, where ACL-A and ACL-B are in both the old and new collections. Because ACL-D and ACL-C are not in the LCS, their respective filters can be generated from the rules and added to the merged list 2006 (FIG. 20B). The plus sign (+) notation in FIG. 20B (and FIG. 20D) refers to new filters and those filters will have their version bit set to the toggled value of the current state of the system-level version bit. The minus sign (−) notation refers to old filters and those filters will have their version bits set to the current state of the system-level version bit. Filters that do not have '+' or '−' means they are common to both the old and new lists; the version bits in these filters are set to "don't care" (masked off).

FIG. 20C shows the resulting filters from processing each ACL in the LCS list, namely ACL-A and ACL-B. Consider ACL-A, for example. There is a rule named "r1" and a rule named "r2" that appear in ACL-A in the old collection and ACL-A in the new collection. As for rules r1 and r2, filters in the old and new rules are generated and a filter LCS is obtained. In rule r1, for example, the filter LCS comprises filters f1 and f2 and written to the merged list. Filter f3 from "old" rule r1 is written to the merged list and, likewise, filter f33 from "new" rule r1 is written to the merged list. Likewise for rule r2. Rule r3 appears only in one of the collections, namely ACL-A in the old collection. Accordingly, filters for rule r3 can be generated and written to the merged list. A similar process applies to ACL-B.

FIG. 20D shows the final merged list 2006. It can be seen that in accordance with the present disclosures, the filters are grouped in the merged list according to the rules from which they are generated. The rules, in turn, are grouped in the merged list according to the ACLs with which they are associated. The merged list 2006 can then be processed as shown in FIG. 14 in make-before-break fashion to remove the old filters with minimal to no disruption in traffic.

FURTHER EXAMPLES

Features described above as well as those claimed below may be combined in various ways without departing from the scope hereof. The following examples illustrate some possible, non-limiting combinations:

(A1) A method in a network device having stored in a memory thereof a plurality of filters generated from a first plurality of access control lists (ACLs) comprises: receiving a second plurality of ACLs; producing a first list comprising ACLs that are common to both the first and second plurality of ACLs; storing into a merged list first filters generated from ACLs in the first and second plurality of ACLs that are not listed in the first list; producing a plurality of second lists, each second list corresponding to an ACL listed in the first list and comprising rules that are common to both an ACL in the first plurality of ACLs and an ACL in the second plurality of ACLs that are identified by the listed ACL; storing into the merged list second filters generated from rules in the first and second plurality of ACLs that are not in any of the plurality of second lists; and for each rule listed in each of the plurality of second lists: producing third filters from a first rule in the first plurality of ACLs and fourth filters from a second rule in the second plurality of ACLs; computing a third list comprising filters that are common to both the third and fourth filters; and storing each of the third and fourth filters into the merged list, including setting a version bit of the filter being stored according to whether or not the filter is in the third list. The method further comprises replacing the plurality of filters stored in the memory of the network device with filters stored in the merged list.

(A2) For the method denoted as (A1), the first list is a longest common subsequence (LCS) of ACLs between the first and second plurality of ACLs, wherein each second list is an LCS of rules, wherein the third list is an LCS of filters.

(A3) For the method denoted as any of (A1) through (A2), producing the first list includes sorting ACL identifiers of ACLs in the first plurality of ACLs and in the second plurality of ACLs, wherein the first list comprises ACL identifiers of ACLs that are common to both the first and second plurality of ACLs.

(A4) For the method denoted as any of (A1) through (A3), the method further comprises producing the first list using an intersection algorithm that has a complexity O(N), where N is a number of ACLs in the first and second plurality of ACLs.

(A5) For the method denoted as any of (A1) through (A4), the method further comprises producing the plurality of second lists using a difference algorithm that has a complexity of O(ND), where N is a number of rules in the first and second plurality of ACLs and D is a number of rules that are common between the the first and second plurality of ACLs.

(A6) For the method denoted as any of (A1) through (A5), computing the third list includes sorting the filters in the rule in the first plurality of ACLs and in the rule in the second plurality of ACLs.

(A7) For the method denoted as any of (A1) through (A6), the method further comprises computing the third list using an intersection algorithm that has a complexity O(N), where N is a number of filters in the first rule and in the second rule.

(B1) A network device comprising: a first memory; a second memory; and one or more computing elements. The first memory having stored therein executable program code, which when executed by the one or more computing elements, causes the one or more computing elements to: compute a longest common subsequence of access control lists (ACL LCS) from a first plurality of ACLs and a second plurality of ACLs; generate first filters from ACLs that are not identified in the ACL-LCS and store the first filters in a merged list; compute a plurality of rules LCSs from rules in ACLs identified in the ACL LCS; generate second filters from rules that are not identified among the plurality of rules LCSs and store the second filters in the merged list; compute a plurality of filter LCSs from third filters computed from rules identified among the rules LCSs; store the third filters in the merged list, including setting a version bit on each filter in accordance with whether or not the filter is among the plurality of filter LCSs; and store filters in the merged list to the second memory.

(B2) For the network device denoted as (B1), to compute the ACL LCS includes: sorting identifiers of ACLs in the first plurality and second plurality of ACLs; and computing an LCS of ACLs identifiers between the sorted ACL identifiers in the first plurality and second plurality of ACLs.

(B3) For the network device denoted as any of (B1) through (B2), to compute a given rules LCS does not include sorting rules used to compute the given rules LCS.

(B4) For the network device denoted as any of (B1) through (B3), to compute a given filter LCS includes: sorting identifiers of filters used to compute the given filter LCS; and computing an LCS of filter identifiers between the sorted filter identifiers.

(B5) For the network device denoted as any of (B1) through (B4), wherein computing the ACL LCS includes using an intersection algorithm that has a complexity O(N), where N is a number of ACLs in the first and second plurality of ACLs.

(B6) For the network device denoted as any of (B1) through (B5), wherein computing a given rules LCS includes using a difference algorithm that has a complexity of O(ND), where N is a number of rules used to compute the given rules LCS and D is a number of rules that are common among the rules used to compute the given rules LCS.

(B7) For the network device denoted as any of (B1) through (B6), wherein computing a given filter LCS includes using an intersection algorithm that has a complexity O(N), where N is a number of filters used to compute the given filter LCS.

(C1) A method in a network device, the method comprising: identifying pairs of ACLs between first and second collections of ACLs that have a same ACL identifier; identifying, for a given pair of ACLs, pairs of rules between the given pair of ACLs that have the same rule name; and for a given pair of rules: generating a first set of filters for a first rule in the given pair of rules and a second set of filters for a second rule in the given pair of rules; and storing each filter among the first and second sets of filters to a merged list, including setting a version bit according to whether the filter occurs in both the first and second sets of filters or not.

(C2) For the method denoted as (C1), the method further comprising: generating filters from rules in ACLs whose identifiers occur only in the first collection or only in the second collection; and storing the generated filters to the merged list.

(C3) For the method denoted as any of (C1) through (C2), the method further comprising: generating filters from rules in the given pair of ACLs whose rule names occur only in one of the given pair of ACLs; and storing the generated filters to the merged list.

(C4) For the method denoted as any of (C1) through (C3), identifying pairs of ACLs between the first and second collections of ACLs includes sorting the ACLs in the first and second collections of ACLs according to their identifiers.

(C5) For the method denoted as any of (C1) through (C4), the method further comprising sorting filters in the first and second sets of filters and identifying pairs of filters between the first and second sets of filters that occur in both the first and second sets of filters.

(C6) For the method denoted as any of (C1) through (C5), identifying pairs of ACLs between the first and second collections of ACLs uses an intersection algorithm that has O(N) complexity, wherein identifying pairs of rules between the given pair of ACLs uses an intersection algorithm that has O(ND) complexity, where N is a number of rules in the given pair of ACLs and D is a number of rules that have the same rule name.

CONCLUSIONS

Embodiments in accordance with the present disclosure provide for hitless upgrade of packet matching rules in a network device to replace an already installed set of old rules with a set of replacement rules, while at the same time reducing the amount of memory (e.g., TCAM) needed to provide the hitless upgrade. For example, a conventional brute force approach to providing hitless upgrade is to simply download the entire set of replacement rules in an area of the TCAM that is not being used by the existing rules. When the download is complete, simply change the TCAM logic to match against the newly downloaded rules. This approach, however, requires $size_{old-rules}+size_{new-rules}$ amount of memory in the TCAM. This presents at least two challenges: (1) if the TCAM is highly utilized, there may not be sufficient space in the TCAM to download a new set of replacement rules; and (2) designing a network device with a larger TCAM just for the purpose of doing occasional upgrades can be costly in terms of material cost (TCAMs can be expensive) and power requirements (CAMs are generally power hungry devices). In a typical installation, the number of rules can be many 100s of rules.

By contrast, a merged list in accordance with the present disclosure can represent a maximum overlap between the old list of rules and the replacement rules, while maintaining order of priority among the old rules and the replacement rules. Instead of having a size that is the sum of the old list and the replacement list, namely $size_{old-rules}+size_{new-rules}$, a merged list in accordance with the present disclosure has a size $size_{old-rules}+size_{new-rules}-size_{subsequence-list}$, where $size_{subsequence-list}$ is the size of a subsequence. Using the example shown in FIGS. 8A and 8B, the sizes of the old rules (string 704) and new rules (string 706) are 7 and 9, respectively. The size of the combination of the lists is therefore 7+9=16. The size of the subsequence (822) is 5. The size of the merged list is therefore 7+9−5=11, which can be verified by merged sequence 1002 in FIG. 10. In a situation where the replacement rules represent a small number of changes to the old rules, the size of the subsequence list can be quite large, indicating that there is a high degree of commonality between the old rules and the replacement rules and the resulting merged list that is downloaded to the TCAM can be much smaller than $size_{old-rules}+size_{new-rules}$.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

The invention claimed is:

1. A method in a network device having stored in a memory thereof a plurality of filters generated from a first plurality of access control lists (ACLs), the method comprising:
   receiving a second plurality of ACLs;
   producing a first list comprising ACLs that are common to both the first and second plurality of ACLs, wherein the first list is a longest common subsequence (LCS) of the ACLs between the first and second plurality of ACLs;
   storing into a merged list first filters generated from ACLs in the first and second plurality of ACLs that are not listed in the first list;
   producing a plurality of second lists, each second list corresponding to an ACL listed in the first list and comprising rules that are common to both an ACL in the first plurality of ACLs and an ACL in the second plurality of ACLs that are identified by the listed ACL, wherein each second list is an LCS of the rules;
   storing into the merged list second filters generated from rules in the first and second plurality of ACLs that are not in any of the plurality of second lists;
   for each rule listed in each of the plurality of second lists:
      producing third filters from a first rule in the first plurality of ACLs and fourth filters from a second rule in the second plurality of ACLs;
      computing a third list comprising filters that are common to both the third and fourth filters, wherein the third list is an LCS of the filters; and
      storing each of the third and fourth filters into the merged list, including setting a version bit of the filter being stored according to whether or not the filter is in the third list; and
   replacing the plurality of filters stored in the memory of the network device with filters stored in the merged list.

2. The method of claim 1, wherein producing the first list includes sorting ACL identifiers of ACLs in the first plurality of ACLs and in the second plurality of ACLs, wherein the first list comprises ACL identifiers of ACLs that are common to both the first and second plurality of ACLs.

3. The method of claim 1, further comprising producing the first list using an intersection algorithm that has a complexity O(N), where N is a number of ACLs in the first and second plurality of ACLs.

4. The method of claim 1, further comprising producing the plurality of second lists using a difference algorithm that has a complexity of O(ND), where N is a number of rules in the first and second plurality of ACLs and D is a number of rules that are common between the first and second plurality of ACLs.

5. The method of claim 1, wherein computing the third list includes sorting the filters in the rule in the first plurality of ACLs and in the rule in the second plurality of ACLs.

6. The method of claim 1, further comprising computing the third list using an intersection algorithm that has a complexity O(N), where N is a number of filters in the first rule and in the second rule.

7. A network device comprising:
   a first memory;
   a second memory; and
   one or more computing elements,
   the first memory having stored therein executable program code, which when executed by the one or more computing elements, causes the one or more computing elements to:
      compute a longest common subsequence of access control lists (ACL LCS) from a first plurality of ACLs and a second plurality of ACLs;
      generate first filters from ACLs that are not identified in the ACL-LCS and store the first filters in a merged list;
      compute a plurality of rules LCSs from rules in ACLs identified in the ACL LCS;
      generate second filters from rules that are not identified among the plurality of rules LCSs and store the second filters in the merged list;
      compute a plurality of filter LCSs from third filters computed from rules identified among the rules LCSs;
      store the third filters in the merged list, including setting a version bit on each filter in accordance with whether or not the filter is among the plurality of filter LCSs; and
      store filters in the merged list to the second memory.

8. The network device of claim 7, wherein to compute the ACL LCS includes: sorting identifiers of ACLs in the first plurality and second plurality of ACLs; and computing an LCS of ACLs identifiers between the sorted ACL identifiers in the first plurality and second plurality of ACLs.

9. The network device of claim 7, wherein to compute a given rules LCS does not include sorting rules used to compute the given rules LCS.

10. The network device of claim 7, wherein to compute a given filter LCS includes: sorting identifiers of filters used to compute the given filter LCS; and computing an LCS of filter identifiers between the sorted filter identifiers.

11. The network device of claim 7, wherein computing the ACL LCS includes using an intersection algorithm that has a complexity O(N), where N is a number of ACLs in the first and second plurality of ACLs.

12. The network device of claim 7, wherein computing a given rules LCS includes using a difference algorithm that has a complexity of O(ND), where N is a number of rules used to compute the given rules LCS and D is a number of rules that are common among the rules used to compute the given rules LCS.

13. The network device of claim 7, wherein computing a given filter LCS includes using an intersection algorithm that has a complexity O(N), where N is a number of filters used to compute the given filter LCS.

14. A method in a network device, the method comprising:
   identifying pairs of access control lists (ACLs) between first and second collections of ACLs that have a same ACL identifier, including computing a longest common subsequence (LCS) of the ACL identifiers between the first collection of ACLs and the second collection of ACLs;
   identifying, for a given pair of ACLs, pairs of rules between the given pair of ACLs that have the same rule name, including computing an LCS of the rule names between the given pair of ACLs; and
   for a given pair of rules:
      generating a first set of filters for a first rule in the given pair of rules and a second set of filters for a second rule in the given pair of rules;

computing an LCS of filters between the first set of filters and the second set of filters, wherein filters in the LCS of filters occurs in both the first and second sets of filters; and storing each filter among the first and second sets of filters to a merged list, including setting a version bit according to whether the filter occurs in the LCS of filters or not.

15. The method of claim 14, further comprising:

generating filters from rules in ACLs whose identifiers occur only in the first collection or only in the second collection; and storing the generated filters to the merged list.

16. The method of claim 14, further comprising:

generating filters from rules in the given pair of ACLs whose rule names occur only in one of the given pair of ACLs; and storing the generated filters to the merged list.

17. The method of claim 14, wherein identifying pairs of ACLs between the first and second collections of ACLs includes sorting the ACLs in the first and second collections of ACLs according to their identifiers.

18. The method of claim 14, further comprising sorting filters in the first and second sets of filters and identifying pairs of filters between the first and second sets of filters that occur in both the first and second sets of filters.

19. The method of claim 14, wherein identifying pairs of ACLs between the first and second collections of ACLs uses an intersection algorithm that has O(N) complexity, wherein identifying pairs of rules between the given pair of ACLs uses an intersection algorithm that has O(ND) complexity, where N is a number of rules in the given pair of ACLs and D is a number of rules that have the same rule name.

20. The method of claim 14, wherein computing the LCS of filters between the first set of filters and the second set of filters includes sorting the first set of filters and the second set of filters.

* * * * *